United States Patent
Branover et al.

(10) Patent No.: US 9,261,949 B2
(45) Date of Patent: Feb. 16, 2016

(54) METHOD FOR ADAPTIVE PERFORMANCE OPTIMIZATION OF THE SOC

(71) Applicant: Advanced Micro Devices, Inc., Sunnyvale, CA (US)

(72) Inventors: Alexander J. Branover, Chesnut Hill, MA (US); Ashish Jain, Austin, TX (US); Ann M. Ling, Folscom, CA (US); Maurice B. Steinman, Marlborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 275 days.

(21) Appl. No.: 13/889,840

(22) Filed: May 8, 2013

(65) Prior Publication Data

US 2013/0246820 A1   Sep. 19, 2013

Related U.S. Application Data

(63) Continuation-in-part of application No. 12/915,361, filed on Oct. 29, 2010, now Pat. No. 8,793,512.

(51) Int. Cl.
*G06F 1/32* (2006.01)
*G06F 1/20* (2006.01)

(52) U.S. Cl.
CPC .............. *G06F 1/3296* (2013.01); *G06F 1/206* (2013.01); *G06F 1/324* (2013.01); *Y02B 60/1217* (2013.01); *Y02B 60/1275* (2013.01); *Y02B 60/1285* (2013.01); *Y02B 60/32* (2013.01)

(58) Field of Classification Search
CPC ........ G06F 1/206; G06F 1/324; G06F 1/3296
USPC ......................................................... 713/300
See application file for complete search history.

(56) References Cited

U.S. PATENT DOCUMENTS

| 3,382,460 A | 5/1968 | Blitz et al. |
| 3,997,800 A | 12/1976 | Bain |

(Continued)

FOREIGN PATENT DOCUMENTS

| EP | 1241788 A1 | 9/2002 |
| JP | 2008004094 A | 1/2008 |

(Continued)

OTHER PUBLICATIONS

Non-Final Office Action in Japanese Application No. 2013-536717, mailed Dec. 2, 2014, 6 pages.

(Continued)

*Primary Examiner* — Vincent Tran
(74) *Attorney, Agent, or Firm* — Rory D. Rankin; Meyertons, Hood, Kivlin, Kowert & Goetzel, P.C.

(57) ABSTRACT

An apparatus and method for dynamically adjusting power limits for processing nodes and other components, such as peripheral interfaces, is disclosed. The apparatus includes multiple processing nodes and other components, and further includes a power management unit configured to set a first frequency limit for at least one of the processing nodes responsive to receiving an indication of a first detected temperature greater than a first temperature threshold. Initial power limits are set below guard-band power limits for components that do not have reliable reporting of power consumption or for cost or power saving reasons. The amount of throttling of processing nodes is used to adjust the power limits for the processing nodes and these components.

20 Claims, 14 Drawing Sheets

(56) References Cited

U.S. PATENT DOCUMENTS

| | | |
|---|---|---|
| 4,105,979 A | 8/1978 | Kage |
| 4,186,637 A | 2/1980 | Swain et al. |
| 4,191,942 A | 3/1980 | Long |
| 4,284,906 A | 8/1981 | Manfredi |
| 4,315,166 A | 2/1982 | Hughes |
| 4,471,310 A | 9/1984 | Yenisey |
| 4,573,017 A | 2/1986 | Levine |
| 4,855,622 A | 8/1989 | Johnson |
| 5,485,129 A | 1/1996 | Franson et al. |
| 5,517,521 A | 5/1996 | Strawn |
| 5,600,347 A | 2/1997 | Thompson et al. |
| 5,740,417 A | 4/1998 | Kennedy et al. |
| 5,825,218 A | 10/1998 | Colli et al. |
| 5,889,436 A | 3/1999 | Yeung et al. |
| 5,964,881 A | 10/1999 | Thor |
| 6,043,692 A | 3/2000 | Linoff |
| 6,172,611 B1 | 1/2001 | Hussain et al. |
| 6,289,067 B1 | 9/2001 | Nguyen et al. |
| 6,292,062 B1 | 9/2001 | Bourk et al. |
| 6,329,861 B1 | 12/2001 | Francis |
| 6,510,525 B1 | 1/2003 | Nookala et al. |
| 6,518,845 B2 | 2/2003 | Nakamichi |
| 6,553,501 B1 | 4/2003 | Yokoe |
| 6,629,256 B1 | 9/2003 | Ilan et al. |
| 6,630,849 B2 | 10/2003 | Dellow |
| 6,711,694 B1 | 3/2004 | Svensson et al. |
| 6,954,864 B2 | 10/2005 | Schelling |
| 6,988,214 B1 | 1/2006 | Verdun |
| 6,988,217 B1 | 1/2006 | Madrid et al. |
| 7,089,437 B2 | 8/2006 | Swoboda |
| 7,152,169 B2 | 12/2006 | Cooper et al. |
| 7,159,766 B2 | 1/2007 | Wurzburg et al. |
| 7,200,762 B2 | 4/2007 | Pearl |
| 8,112,647 B2 | 2/2012 | Branover et al. |
| 8,862,909 B2 * | 10/2014 | Branover et al. ............. 713/300 |
| 2003/0126478 A1 * | 7/2003 | Burns .................. G06F 1/3203 713/300 |
| 2006/0161375 A1 | 7/2006 | Duberstein et al. |
| 2007/0245161 A1 * | 10/2007 | Shaw et al. ................... 713/300 |
| 2008/0301475 A1 * | 12/2008 | Felter et al. .................. 713/300 |
| 2009/0150696 A1 | 6/2009 | Song et al. |
| 2009/0164814 A1 | 6/2009 | Axford et al. |
| 2009/0235108 A1 | 9/2009 | Gold et al. |
| 2010/0073068 A1 | 3/2010 | Cho et al. |
| 2010/0162006 A1 * | 6/2010 | Therien et al. ................ 713/300 |
| 2011/0022857 A1 * | 1/2011 | Nussbaum et al. ........... 713/300 |
| 2012/0023351 A1 * | 1/2012 | Wakrat et al. ................. 713/322 |
| 2013/0125123 A1 * | 5/2013 | Shetty et al. ..................... 718/1 |
| 2014/0101475 A1 * | 4/2014 | Berke et al. .................. 713/340 |

FOREIGN PATENT DOCUMENTS

| | | |
|---|---|---|
| JP | 2009230670 A | 10/2009 |
| WO | 2006073899 A2 | 7/2006 |
| WO | 2009114141 A1 | 9/2009 |

OTHER PUBLICATIONS

International Search Report in International Application No. PCT/US 02/41658, mailed May 14, 2004, 7 pages.

"Advanced Configuration and Power Interface Specification", Hewlett-Packard Corporation, Intel Corporation, Microsoft Corporation, Phoenix Technologies Ltd., Toshiba Corporation, Oct. 10, 2006, pp. i-191.

"Advanced Configuration and Power Interface Specification", Hewlett-Packard Corporation, Intel Corporation, Microsoft Corporation, Phoenix Technologies Ltd., Toshiba Corporation, Oct. 10, 2006, pp. 192-402.

"Advanced Configuration and Power Interface Specification", Hewlett-Packard Corporation, Intel Corporation, Microsoft Corporation, Phoenix Technologies Ltd., Toshiba Corporation, Oct. 10, 2006, pp. 403-611.

International Search Report and Written Opinion in International Application No. PCT/US20111057640, mailed Feb. 6, 2012, 10 pages.

Atienza, et al., "Inducing Thermal-Awareness in Multicore Systems Using Networks-on-Chip", ISVLSI '09 Proceedings of the 2009 IEEE Computer Society Annual Symposium on VLSI, May 13, 2009, pp. 187-192, IEEE Computer Society, Washington, DC, USA.

* cited by examiner

3 Cores Idle, 1 Core Active
F_max = 3.6 GHz 11-1: 7 Watts
11-2: 7 Watts
11-3: 7 Watts
11-4: 19 Watts Global TDP = 40 Watts Allocated Power Budgeting Table 800

| Component | Power Budget |
|---|---|
| Communication Hub | 900mW |
| Processing Nodes | 800mW |
| Display Graphics Interface | 300mW |
| Memory Controller | 300mW |
| Input/Output (I/O) Interface | 200mW |
| Remaining Components | 200mW |
| Total | 2700mW |

FIG.8

METHOD FOR ADAPTIVE PERFORMANCE OPTIMIZATION OF THE SOC

This application is a continuation-in-part of U.S. patent application Ser. No. 12/915,361, filed Oct. 29, 2010, entitled METHOD AND APPARATUS FOR THERMAL CONTROL OF PROCESSING NODES.

BACKGROUND

1. Field of the Invention

This invention relates to integrated circuits, and more particularly, to thermal control of integrated circuits.

2. Description of the Related Art

During the design of a processor or other type of integrated circuit (IC), many factors must be considered. Typically, factors such as performance are balanced with other factors such as power consumption. Another factor that affects the design of many IC's is thermal output. Many IC's may generate a significant amount of heat during operation. Left unchecked, the heat generated during operation of an IC can cause damage or complete failure.

To prevent heat-related damage, many IC's employ some form of thermal control apparatus. In various embodiments, a thermal control apparatus in an IC may include one or more temperature sensors at various locations, and a control unit. The control unit may receive temperature indications from the various sensors, and compare these indications to one or more temperature thresholds. In the event that the temperature reported from one of the temperature sensors exceeds a threshold, operation of the IC may be scaled back to prevent further temperature increases. Scaling back the performance of the IC may be accomplished by reducing a supply voltage provided thereto, reducing a clock frequency, both, or by some other method (e.g., reducing, limiting, or re-allocating a workload of the IC). The IC may be held in the reduced performance state until the temperature falls below the threshold, and additionally for a period of time thereafter.

The temperature threshold at which performance is reduced may be based on a parameter known as thermal design power (TDP), which may be defined as the amount of power that may be dissipated by the IC (or cooling system thereof) without exceeding a specified maximum temperature of the IC itself. TDP may be set based on a specified ambient temperature. For example, the TDP of an IC may be specified for an ambient temperature of 35° C. That is, power consumption may be enabled up to an amount that would cause overheating (as determined by the maximum specified IC temperature) at an ambient temperature (e.g., room temperature) of 35° C. The maximum temperature may thus be specified as a temperature on the IC die in which TDP can no longer be dissipated. Power consumption, and thus performance may thus be reduced when this temperature is reached.

SUMMARY OF EMBODIMENTS OF THE DISCLOSURE

In another embodiment, a method for dynamically adjusting power limits for components on an integrated circuit includes setting initial power limits below guard-band power limits for at least components that do not have available or reliable dynamic reporting of power consumption. These components may include one or more interfaces to external devices. Initial power limits for processing nodes may be increased based on the difference between guard-band and initial power limits for these components. During operation, the amount of throttling performed on the processing nodes may be monitored. The amount of throttling may be used to adjust the power limit values for both the processing nodes and the interfaces.

BRIEF DESCRIPTION OF THE DRAWINGS

Other aspects of the invention will become apparent upon reading the following detailed description and upon reference to the accompanying drawings in which:

FIG. 8 is a block diagram of one embodiment of a power budgeting table used to set initial power limits for components on an integrated circuit.

Figure 1:
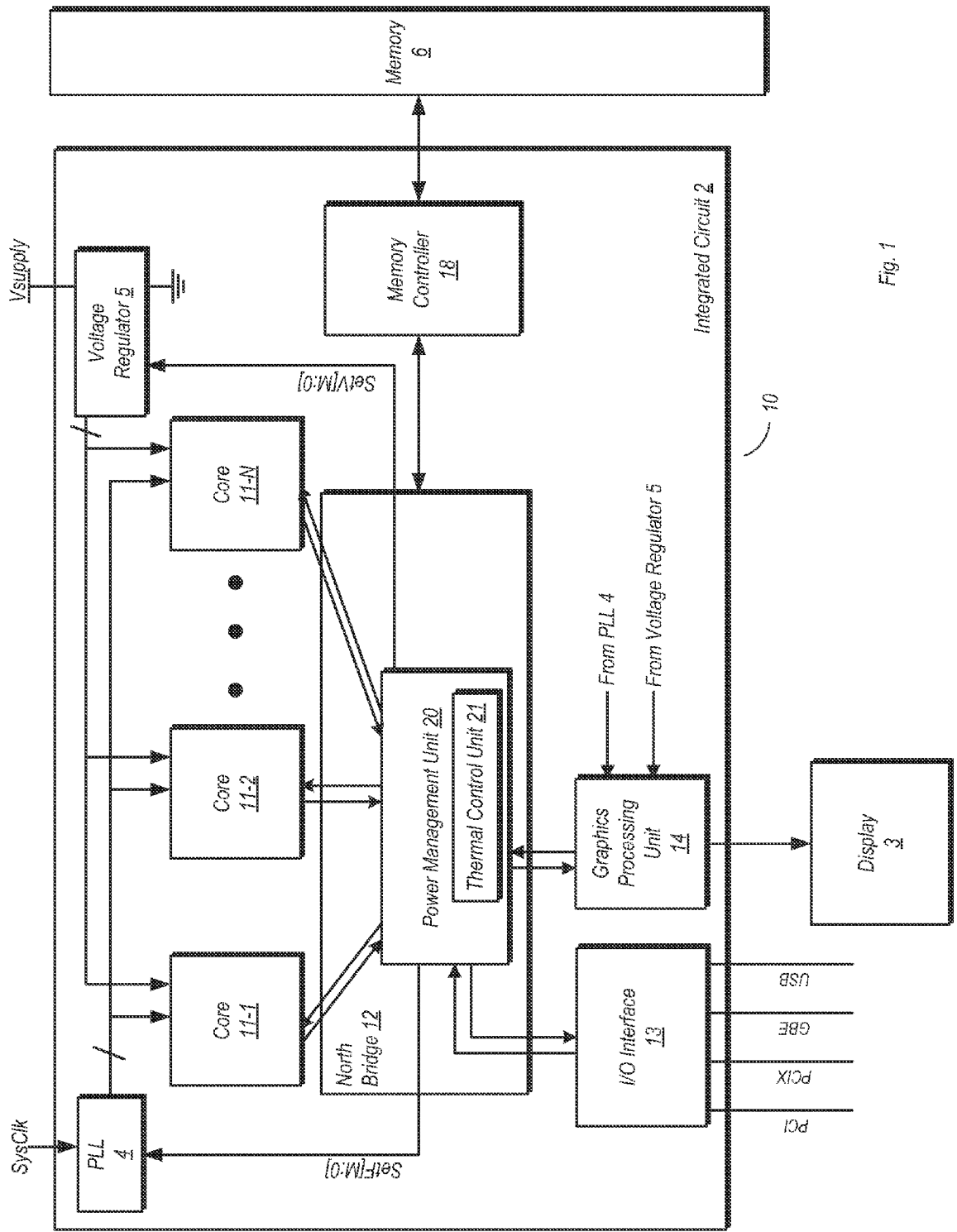
FIG. 1 is a block diagram of one embodiment of an integrated circuit (IC) system on a chip (SOC)

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Overview:

A method an apparatus for per-node thermal control (PNTC) of a multi-core processor will now be discussed in greater detail. While the discussion is directed to processors having a plurality of processor cores (which may include a graphics processing unit), the various method and apparatus embodiments discussed herein may be more broadly applied to any integrated circuit (IC) having multiple functional units. Accordingly, discussion of the various method and apparatus embodiments herein is intended to be exemplary, but not limiting. For the purposes of this disclosure, a processing node may be defined as any type of functional unit that performs processing, such as a processor core of a general-purpose computer processor, a graphics processing unit, or other type of processing circuitry. Furthermore, the method and apparatus discussed herein may be applied to IC's having multiple different types of processing nodes on the same IC die.

The use of PNTC may allow for a greater performance-per-watt of a processor or other IC than exclusive use of a globally applied hardware thermal control (HTC). For example, a processor may be designed to have a global thermal design power (TDP) limit for the IC as a whole based on an ambient temperature of 35° C. That is, the TDP limit may be reached when an on-die temperature reaches a predetermined temperature threshold set close to or at the die reliability limit. Greater performance can be achieved by operating the processor using a TDP limit based on an ambient temperature of, for example, 28° C. This is due to the fact that the processor would have to operate at a higher clock frequency and/or operating voltage to reach the predetermined temperature threshold in ambient conditions of 28° C. since the surrounding air at the lower ambient temperature will dissipate heat at a greater rate than at the higher ambient temperature of 35° C. Accordingly, local (e.g., per core) TDP limits may be set based on the lower ambient temperature conditions. Furthermore, local TDP limits may be varied during operation. For example, the local TDP limit for an active processor core may be increased when one or more other processor cores are in an inactive state.

For the purposes of this disclosure, a global TDP limit may be defined as a limit, applied to an IC as a whole, as a maximum amount of power dissipation for which the IC is rated. The global TDP limit may be fixed for a given IC design. A local TDP limit may be defined as a TDP limit applied to the processing nodes/cores on a per-core or per-processing node basis, including to processor cores, a graphics processing unit, or any other functional unit in which a significant amount of heat may be generated. Furthermore, the local TDP limit for a given processing node may be varied based on the states of other processing nodes.

An operating point for the purposes of this disclosure may be defined as a clock frequency, and may also include an operating voltage (e.g., supply voltage provided to a functional unit). Increasing an operating point for a given functional unit may be defined as increasing the frequency of a clock signal provided to that unit, and may also include increasing its operating voltage. Similarly, decreasing an operating point for a given functional unit may be defined as decreasing the clock frequency, and may also include decreasing the operating voltage. Limiting an operating point may be defined as limiting the clock frequency and/or operating voltage to specified maximum values for particular set of conditions (but not necessarily maximum limits for all conditions). Thus, when an operating point is limited for a particular processing node, it may operate at a clock frequency and operating voltage up to the specified values for a current set of conditions, but may also operate at clock frequency and operating voltage values that are less than the specified values.

Using PNTC, a threshold temperature may be set slightly lower than the temperature threshold used for determining when the global TDP limit has been reached. For example, if the threshold temperature for the global TDP limit is 100° C., the temperature threshold for determining when a local TDP limit has been reached may be 96° C. Temperatures of each of the processor cores may be monitored, and if the temperature of a given core reaches this limit, the given core may be throttled by a first amount. For example, in embodiments that conform to the Advanced Configuration and Power Interface (ACPI) specification, the core may be throttled to 90% of the clock frequency of the P0 state (e.g., P0 state clock at 2.0 GHz, core throttled to 1.8 GHz). In addition to throttling the clock frequency, a corresponding operating voltage reduction may also be performed for at least the given core (e.g., reducing the voltage from 1.1 volts to 1.0 volt if operating in the P0 state). In some embodiments, the operating point of the other processor cores may be limited to this operating point as well, although other embodiments are possible and contemplated wherein the operating point is not changed for the other cores. In embodiments where the operating point of all cores is limited responsive to one core reaching a local temperature threshold, other cores may be throttled as well if they are operating in, e.g., the P0 state or high operating point in general. Furthermore, in some embodiments, the processor cores may be coupled to separate, unique voltage planes, and thus their operating voltages may be controlled independent of the other processor cores. In other embodiments, the processor cores may share a voltage plane, with the operating voltage being set based on the operating point for the processor core having the highest local TDP limit.

If the temperature of the given core continues rising after throttling, a global throttling (HTC) may take place wherein all processor cores are throttled to a second operating point limit. More particularly, this may occur when the temperature at any point on the IC die of the processor reaches a global threshold temperature corresponding to the global TDP limit. When this occurs, the clock frequency for all processor cores may undergo a significant reduction through throttling, with the operating voltages also being reduced correspondingly. For example, in one ACPI-compliant embodiment, the processor cores may be throttled such that their clock frequency is limited to 1.0 GHz (where 2.0 GHz is the clock frequency for the P0 state in this embodiment), to the P3 state. Similarly, the operating voltage may also be reduced such that it is limited for all cores.

Local TDP limits for a given processor core may be variable, and may be increased or decreased depending on the state of the other processor cores. For example, in a quad-core processor, when two cores are power-gated (e.g., powered down), while a third core is in a sleep state, the TDP limit for the remaining core may be increased, since the other cores may dissipate some of the heat generated by this core. Since the core local TDP limit may be based on a lower ambient temperature (e.g., 28° C. as opposed to 35° C. for the global TDP limit), it may thus be increased to such a point as to enable overclocking, i.e. running its corresponding clock signal at a frequency higher than specified. For example, in one ACPI-compliant embodiment wherein the clock frequency in the P0 state is 2.0 GHz (and thus the maximum specified clock frequency), a core with a high local TDP limit may be clocked at a frequency greater than 2.0 GHz (e.g., at 3.6 GHz). This may result in greater performance for some processing workloads, particularly those that are compute-bounded. A compute-bounded workload may be defined as a processing workload that is computationally intensive, with infrequent (if any) accesses to main memory. It is noted however, that even if overclocking is enabled for a given processor core due to a high local TDP limit, it is not necessarily performed in all cases. For example, if a processor workload is memory-bounded (i.e. one in which frequent memory accesses are performed, causing corresponding pipeline stalls), overclocking typically does not provide any performance gain. Accordingly, a processor core having a high local TDP limit may nevertheless be operated at a lower clock frequency if processing a memory-bounded workload.

Processor with Power Management Unit:

FIG. 1 is a block diagram of one embodiment of an integrated circuit (IC) coupled to a memory. IC 2 and memory 6, along with display 3, form at least a portion of computer system 10 in this example. In the embodiment shown, IC 2 is a processor having a number of processing nodes 11 (e.g., 11-1, 11-2, and so forth). It is noted that the methodology to be described herein may be applied to other arrangements, such as multi-processor computer systems implementing multiple processors (which may be single-core or multi-core processors) on separate, unique IC dies. In multi-core embodiments, processing nodes 11 may be identical to each other (i.e. homogonous multi-core), or one or more processing nodes 11 may be different from others (i.e. heterogeneous multi-core).

Processing nodes 11 may each include one or more execution units, cache memories, schedulers, branch prediction circuits, and so forth. Furthermore, each of processing nodes 11 may be configured to assert requests for access to memory 6, which may function as the main memory for computer system 10. Such requests may include read requests and/or write requests, and may be initially received from a respective processor core 11 by north bridge 12. Requests for access to memory 6 may be routed through memory controller 18 in the embodiment shown.

Each processor core 11 is coupled to north bridge 12 in the embodiment shown. North bridge 12 may provide a wide variety of interface functions for each of processing nodes 11, including interfaces to memory and to various peripherals. In addition to being coupled to each of processing nodes 11, north bridge 12 is also coupled to input/output (I/O) interface 13, graphics processing unit (GPU) 14, memory controller 18, phase-locked loop (PLL) 4, and voltage regulator 5. Additional functional units may also be included in some embodiments. North bridge 12 may serve as a communications hub for activity in computer system 10, routing and coordinating communications between processing nodes 11, memory 6 (via memory controller 18), display 3 (via GPU 14), and various peripheral devices (via I/O interface 13).

I/O interface 13 may function as a south bridge device in computer system 10. A number of different types of peripheral buses may be coupled to I/O interface 13. In this particular example, the bus types include a peripheral component interconnect (PCI) bus, a PCI-Extended (PCI-X), a PCIE (PCI Express) bus, a gigabit Ethernet (GBE) bus, and a universal serial bus (USB). However, these bus types are exemplary, and many other bus types may also be coupled to I/O interface 13. Peripheral devices may be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices that may be coupled to I/O unit 13 via a corresponding peripheral bus may assert memory access requests using direct memory access (DMA). These requests (which may include read and write requests) may be conveyed to north bridge 12 via I/O interface 13, and may be routed to memory controller 18.

GPU 14 may perform video processing functions for computer system 10. Video processing functions performed by GPU 14 may include basic video rendering, as well as 3-D graphics and other types of complex graphics functions. The video information processed by GPU 14 may be output for display on display 3, which may be one of a number of different types of display units. Display 3 may be implemented as flat panel liquid crystal display (LCD), a light-emitting diode (LED) display, a plasma display, a cathode ray tube (CRT) display, or any other suitable type.

In the embodiment shown, GPU 14 may include a display buffer that may store data for display processing. The data for display processing may be read from memory 6, via memory controller 18 and north bridge 12. Accordingly, GPU 14 may be configured for direct memory access (DMA) of memory 6 for updating frames and filling the display buffer.

In the embodiment shown, north bridge 12 includes a power management unit 20 that is configured to manage the power consumption of each of processing nodes 11 based on their respective activity levels or workloads, as will be discussed in further detail below. Furthermore, in multi-core (or multi-processor) embodiments, power management unit 20 may set the operating points of the individual processing nodes 11 independent of one another. Thus, while a first processor core 11 may operate at a first operating point, a second processor core 11 may operate at a second operating point different than the first. Since GPU 14 may consume a significant amount of power (and generate a significant amount of heat), its respective operating point may also be controlled by power management unit 20 in the same manner as the operating points of processing nodes 11. Accordingly, the discussion below directed to setting a local TDP limit and controlling the operating point of a given one of processing nodes 11 may also apply to GPU 14.

Power management unit 20 in the embodiment shown also includes a thermal control unit 21. The setting of operating points by power management unit 20 may be performed at least in part based on operations performed by thermal control unit 21. In one embodiment, thermal control unit 21 may monitor temperature information received from each of the processing nodes 11 (and from graphics processing unit 14, which will be discussed below) in order to determine whether IC 2 is operating within a global TDP power limit (hereinafter referred to as a global power limit). Furthermore, thermal control unit 21 may also set and vary local TDP limits (hereinafter local power limits) for each of the processing cores 11. For example, in an embodiment having four processing nodes 11, if all four processing nodes 11 are active and processing a workload, their respective local power limits may be set to equal values. However, if two processing nodes 11 are active while the other two are in an idle state, the local power limits for the active nodes may be increased with the local power limits for the idle nodes may be decreased correspondingly. In both of these, as well as other cases, the local power limits for processing nodes 11 may such that the global power limit is not exceeded.

Thermal control unit 21 may also receive temperature information from each of processing nodes 11. The temperature information received may be used for determining whether the processing nodes 11 are operating within their respective local power limits. For example, thermal control unit 21 may compare a reported temperature of a given processor core 11 to a temperature threshold value that is based on its current local power limit. If the temperature is greater than or equal to the threshold temperature, power management unit 20 may respond by performing a limited throttling of the reporting processor core 11. The limited throttling may comprise a small reduction in the operating clock frequency for the reporting processor core 11, and may also include a limited voltage reduction. The operating point of that processor core 11 may be limited thereafter for a time at least until the temperature has fallen below the threshold. Additional time may be allowed for the temperature to allow for additional heat to be dissipated before removing the operating point limit.

In some embodiments, the limiting of the operating point may be performed on a per-node basis, applying only to the processor core 11 in which the temperature exceeded the threshold. In other embodiments, all processing nodes 11 may be limited to the same operating point of the processor core 11 for which the temperature threshold was exceeded. The operating point may be limited by limiting the frequency of the clock signal provided to the processing nodes 11. Further limiting of the operating point may be accomplished by limiting the operating voltage provided to the processing nodes 11.

Thermal control unit 21 may also be configured to determine whether IC 2 as a whole is operating within a global power limit. In addition to receiving temperature information from processing nodes 11, thermal control unit 21 may receive the same from each of the other functional units, as well as from other functional units that may be present in other embodiments. If a temperature reading from any functional unit (or from any point on IC 2) exceeds a second temperature threshold, power management unit 20 may respond by globally throttling IC 2. Globally throttling may be defined by a significant reduction in clock frequency to each of processing nodes 11, and may be applied to the other functional units of IC2 as well. Furthermore, the operating voltage for each of processor core 11 may also be significantly reduced as well. The operating point for all processing nodes 11 subsequent to global throttling may be limited at least until all temperatures reported to thermal control unit 21 are below the second threshold, and may be limited for a specified time thereafter to allow IC 2 to further cool down.

In the embodiment shown, IC 2 includes a phase-locked loop (PLL) 4 coupled to receive a system clock signal. PLL 4 may distribute corresponding clock signals to each of processing nodes 11 and to GPU 14. In this embodiment, the clock signals received by each of processing nodes 11 and GPU 14 are independent of one another. Furthermore, PLL 4 in this embodiment is configured to individually control and alter the frequency of each of the clock signals provided to respective ones of processing nodes 11, independently of one another. PLL 4 may also control and alter the frequency of the clock signal provided to GPU 14 independently of processing nodes 11. As will be discussed in further detail below, the frequency of the clock signal received by any given one of processing nodes 11 may be increased or decreased in accordance with a variable local power limit, temperature values reported therefrom, and performance demands imposed thereupon. The various frequencies at which clock signals may be output from PLL 4 may correspond to different operating points for each of processing nodes 11. Accordingly, a change of operating point for a particular one of processing nodes 11 may be put into effect by changing the frequency of its respectively received clock signal.

In the case where changing the respective operating points of one or more processing nodes 11 includes the changing of one or more respective clock frequencies, power management unit 20 may change the state of digital signals SetF [M:0] provided to PLL 4. This set of digital signals may contain information for setting the clock frequency for each functional unit coupled to PLL 4. Responsive to the change in these signals, PLL 4 may change the clock frequency of the affected functional units.

In the embodiment shown, IC 2 also includes voltage regulator 5. In other embodiments, voltage regulator 5 may be implemented separately from IC 2. Voltage regulator 5 may provide a operating voltage (or supply voltage) to each of processing nodes 11. In some embodiments, voltage regulator 5 may provide an operating voltage that is variable according to a particular operating point (e.g., increased for greater performance, decreased for greater power savings). In some embodiments, each of processing nodes 11 may share a voltage plane. Thus, each processor core 11 in such an embodiment operates at the same voltage as the other ones of processing nodes 11. In another embodiment, voltage planes are not shared, and thus the supply voltage received by each processor core 11 may be set and adjusted independently of the respective supply voltages received by other ones of processing nodes 11. Thus, operating point adjustments that include adjustments of an operating voltage may be selectively applied to each processor core 11 independently of the others in embodiments having non-shared voltage planes. In the case where changing the operating point includes changing an operating voltage for one or more processing nodes 11, power management unit 20 may change the state of digital signals SetV[M:0] provided to voltage regulator 5. Responsive to the change in the signals SetV[M:0], voltage regulator 5 may adjust the operating voltage provided to the affected ones of processing nodes 11. GPU 14 may share a voltage plane with one or more of processing nodes 11 in some embodiments, while having its own voltage plane in other nodes, and may also have its supply voltage adjusted accordingly.

As noted above, operating points for each of processing nodes 11 may be set or limited based on reported temperatures, variable local power limits, and a fixed global power limit. In addition, operating points for each of processing nodes 11 may also be set in accordance with a respective activity level (e.g., processing workload). In the embodiment shown, power management unit 20 may receive information indicating the activity level for each of processing nodes 11, and may set the operating point accordingly, within local and global power limits. Power management unit 20 may also set the operating point of a given processing node based on a particular type of workload. Generally speaking, a processor core 11 executing a compute-bounded workload may be set to a higher operating point, or to a lower operating point when executing a memory-bounded workload. For workloads that are neither compute-bounded or memory-bounded, a processor core 11 may be set to an intermediate operating point. Activity levels and types of workloads may be determined by power management unit 20 based on various metrics, such as committed instructions per second, memory access requests, cache hits/misses, pipeline stalls, branch mispredictions, instructions issued, instructions executed, and so forth.

As previously noted, an operating point of a processor core 11 may be defined by at least a clock frequency, and may also be defined by an operating voltage. Generally speaking, transitioning to a "higher" operating point may be defined by increasing the clock frequency for the affected processor core 11. Transitioning to a higher operating point may also include increasing its operating voltage. Similarly, transitioning to a "lower" operating point may be defined by decreasing the clock frequency for the affected processor core 11. A decrease in the operating voltage provided to an affected processor core 11 may also be included in the definition of transitioning to a lower operating point.

In one embodiment, the operating points may correspond to performance states (hereinafter 'P-states') of the Advanced Configuration and Power Interface (ACPI) specification. Table 1 below lists P-states for one embodiment implemented using the ACPI standard.

TABLE 1

| P-state index | Frequency | Voltage |
| --- | --- | --- |
| P0 | 2 GHz | 1.1 V |
| P1 | 1.8 GHz | 1.0 V |
| P2 | 1.5 GHz | 0.9 V |
| P3 | 1 GHz | 0.85 V |
| P4 | 800 MHz | 0.8 V |

The P-states listed in Table 1 above may be applied when an ACPI-compliant processor is operating in a non-idle state known as C0. For an embodiment corresponding to Table 1 above, P-state P0 is the highest operating point, having a clock frequency of 2 GHz and an operating voltage of 1.1 volts. Power management unit 20 in one embodiment may cause a processor core 11 to operate at P-state P0 responsive to a high activity level when permitted by a current local power limit. Operation in P-state P0 may be utilized for processing workloads that are compute-bounded. A compute-bounded workload may be time sensitive and computationally intensive, requiring few (if any) memory accesses. It may be desirable to execute the workload in the shortest time possible to maintain maximum performance while also enabling a quicker return to an idle state commensurate with lower power consumption. Therefore, compute-bounded workloads having a high activity level may be executed in P-state P0, which may enable faster completion.

P-state P4 is the lowest operating point in this particular embodiment, having a clock frequency of 800 MHz and an operating voltage of 0.8V. Power management unit 20 may cause a processor core 11 to operate in P-state P4 responsive to a low activity level, even if higher P-states would fall within a current local power limit. P-state P4 may be used with memory-bounded workloads as well as with other tasks that are not time-sensitive (or frequency-sensitive). Memory-bounded workloads are those which include frequent accesses to system memory. Since memory accesses involve large latencies (in comparison with the execution times of instructions that do not access memory), reducing the clock frequency for memory-bounded workloads may have a minimal performance impact and with power savings that may improve the performance-per-watt metric of the system.

If a detected activity level is greater than the low activity threshold and less than the high activity threshold, operation of the corresponding processor core 11 may be set to any one of P-states P1, P2, P3, under direction of an OS, other software, firmware, and/or other hardware, depending on the specific embodiment and providing that operation in these P-states falls within current local power limits.

It is noted that the P-states listed in Table 1 are an exemplary set of operating points. Embodiments that use operating points having different clock frequencies and operating voltages are possible and contemplated. Further, as previously noted above, some embodiments may utilize a shared voltage plane for processing nodes 11, and thus their respective operating points may be defined on the basis of a clock frequency. In some embodiments, the operating voltage for each of the processing nodes may either remain fixed, while in other embodiments, the operating voltage may be adjusted for all processing nodes 11 at the same time. It is also noted that the operating points listed as P-states in Table 1 above may also be utilized with non-ACPI embodiments.

Furthermore, even in ACPI embodiments, the operating points listed above may not be all encompassing when PNTC is utilized. More particularly, in some cases, a performance boost beyond the P0 state may be applied to a given processor core 11 when appropriate for the processing workload and permitted by a current local power limit. For example, consider a situation wherein a given one of processing nodes 11 is executing a compute-bounded workload while the remaining ones of processing nodes 11 are in an idle state. In such a case, the local power limit for the idle processing nodes may be reduced, while the local power limit for the active processor core 11 may be increased. The increase in the local power limit may thus enable overclocking for the active processor core 11. Accordingly, since the active processor core 11 is executing a compute-bounded workload in this example, the frequency of the clock signal provided thereto may be increased to a value that is greater than that for the P0 state. This in turn may enable faster execution of the compute-bounded workload, and may be performed while allowing IC 2 to remain within the global power limit if the ambient temperature is low enough. Furthermore, if the ambient temperature is less than the value upon which the local power limit is based, overclocking the active processor core 11 may enable faster execution of the compute-bounded workload without the possibility of throttling. This type of deterministic performance may lead to greater performance-per-watt in low ambient temperature environments.

Figure 2:
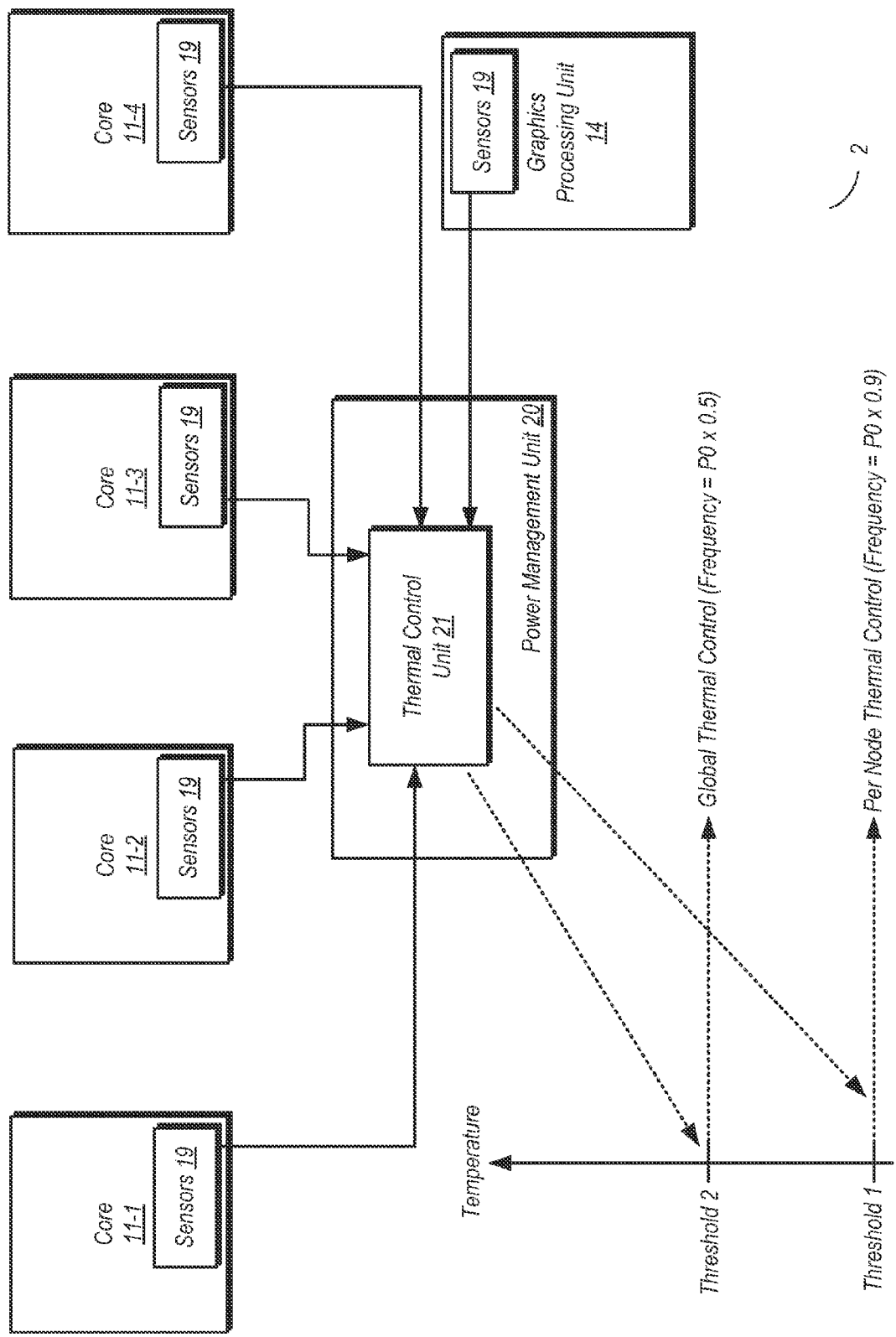
FIG. 2 is a block diagram of one embodiment of a multi-core processor including a thermal control unit.

Global and Local Thermal Design Power (TDP):

FIG. 2 is a block diagram of one embodiment of a multi-core processor including a thermal control unit. More particularly, FIG. 2 illustrates the functional relationship between the various processing nodes 11, GPU 14, and thermal control unit 21. FIG. 2 also includes a graph illustrating the difference in system response based on local power limits (which may be variable and applied to functional units on an individual basis) and a global power limit (which may be fixed and applied to the IC as a whole).

In the embodiment shown, IC 2 includes four processing cores 11 (i.e., cores 11-1 to 11-4) and a GPU 14 each coupled to thermal control unit 21 of power management unit 20. Each of processing cores 11 and GPU 14 may occupy a certain portion of the area of the die of IC 2. Furthermore, each of processing cores 11 and GPU 14 in the embodiment shown includes one or more sensors 19, each of which is configured to sense temperature within their respective units. In some embodiments, multiple instances of sensor 19 may be placed in various locations throughout area of the IC die upon which each functional unit is implemented. In some embodiments, each sensor 19 may be coupled to report a respectively sensed temperature to thermal control unit 21. In other embodiments, each functional unit may be configured to report only the highest measured temperature for that functional unit.

Sensors 19 may be implemented in a variety of ways. In one embodiment, sensors 19 may be implemented as ring oscillator based temperature sensors. The ring oscillator in such temperatures may output a signal having a certain frequency, with the frequency increasing as temperature increases, and vice versa. Temperature sensors that output a voltage or current that is proportional to the measured temperature are also possible and contemplated. In another embodiment, temperature values may be extrapolated from other information, such as an executed code stream or signals generated during operation.

Thermal control unit 21 may compare the temperatures received from each of the functional units to a first temperature threshold and a second temperature threshold, as shown in the graph accompanying the block diagram in FIG. 2. The first temperature threshold may be used in performing thermal control on a per node basis (PNTC), while the second temperature threshold may be used in performing thermal control on a global basis (HTC). In the embodiment shown, the first temperature threshold is less than the second temperature threshold. Example values of the first and second temperature thresholds are 96° C. and 100° C., respectively. Furthermore, the first temperature threshold may be based on a maximum local power limit. The first temperature threshold may be set to gradually reduce the performance of a given node when the temperature is detected to rise. The second temperature threshold may be based on a reliability limit, such as a maximum junction temperature, and a global power limit. A temperature reading that is greater than the first temperature threshold may indicate that the reporting processing core 11 is exceeding it local power limit. A temperature reading that is greater than the second temperature threshold value may indicate that IC 2 as a whole is exceeding its global power limit.

In the embodiment shown, if a given one of processor cores 11 reports a temperature that is equal to or greater than the first threshold temperature, the reporting processor core 11 may be throttled. More particularly, the clock frequency of the reporting processor core 11 may be reduced to a specified level responsive to thermal control unit 21 determining that its temperature is greater than or equal to the first temperature threshold. In one ACPI-compliant embodiment, the clock frequency of at least the reporting processor core 11 may be reduced to 90% of the frequency of the P0 state. Furthermore, the clock frequency of the reporting processor core 11 may be limited to this operating point at least until its corresponding reported temperature falls below the first threshold, and may remain there for an additional amount of time to allow for additional cooling.

In some embodiments, other ones of processor cores 11 that are active may also be limited in operating point to 90% of the frequency of the P0 state responsive to the one processor core 11 reporting a temperature that is greater than or equal to the first temperature threshold. Embodiments are possible and contemplated wherein the other active processor cores 11 are not limited in operating point when one particular processor core 11 reports a temperature greater than or equal to the first temperature threshold.

In the embodiment shown, if thermal control unit 21 receives a reported temperature value from any processor cores that is equal to or greater than the second temperature threshold, power management unit 20 may respond by globally throttling all active processor cores 11. In one ACPI-compliant embodiment, as illustrated by the accompanying graph, the clock frequency for active processor cores 11 may be throttled to 50% of the frequency of the P0 state. Active processor cores 11 that are already operating at a clock frequency of less than that of 50% of the P0 state may continue to operate as before. However, all processor cores 11 may be limited to an operating point in which the clock frequency is no more than 50% that of the P0 state.

In addition to limiting the clock frequency responsive to a reported temperature meeting or exceeding the second temperature threshold, the operating voltage for each of processor cores 11 may also be limited. Referring back to Table 1, a clock frequency that is 50% of the frequency of the P0 state corresponds to the P3 state for that particular embodiment. The operating voltage in the P3 state in Table 1 is 0.85 volts (1.1. volts for the P0 state). Accordingly, in split-voltage plane embodiments (i.e. each processing core 11 has its own voltage plane), the operating voltage for any processor cores 11 operating at a voltage above that of the P3 state may be reduced to 0.85 volts responsive to thermal control unit 21 determining that a reported temperature reading is at or above the second temperature threshold. In shared voltage plane embodiments (i.e. all processor cores 11 share the same voltage plane), the operating voltage for all processing cores 11 may be set to that of the P3 state. Similar operating voltage adjustments may be made in other embodiments, regardless of whether those embodiments are ACPI-compliant, and regardless of whether processor cores 11 utilize a shared voltage plane or separate voltage planes.

It is again noted that the throttling actions and the limiting of the operating point that is performed on processor cores 11 as described herein may also be applied to GPU 14.

Local TDP Distribution Using Per-Node Thermal Control:

FIGS. 3A-3F are block diagrams illustrating thermal design power allocation for various situations in an embodiment of a processor that utilizes PNTC. More particularly, FIGS. 3A-3F illustrate the local power limit distribution for the various processor cores 11 when each of the cores is in one of a number of various states of activity or idleness. It is noted that idleness for a given one of processor cores 11 may include a clock-gated state (i.e. in which power remains applied by the clock signal to the core is inhibited) and a power-gated state (i.e. when the clock signal is not provided to the core and power is removed therefrom).

It is noted that the examples of FIGS. 3A-3F do not include local power limits that are assigned to GPU 14. However, it is noted that FIGS. 3A-3F are presented for illustrative purposes, and that in various embodiments, a local power limit for a GPU such as GPU 14 may be assigned and varied using the same principles as discussed herein.

Figure 3A:
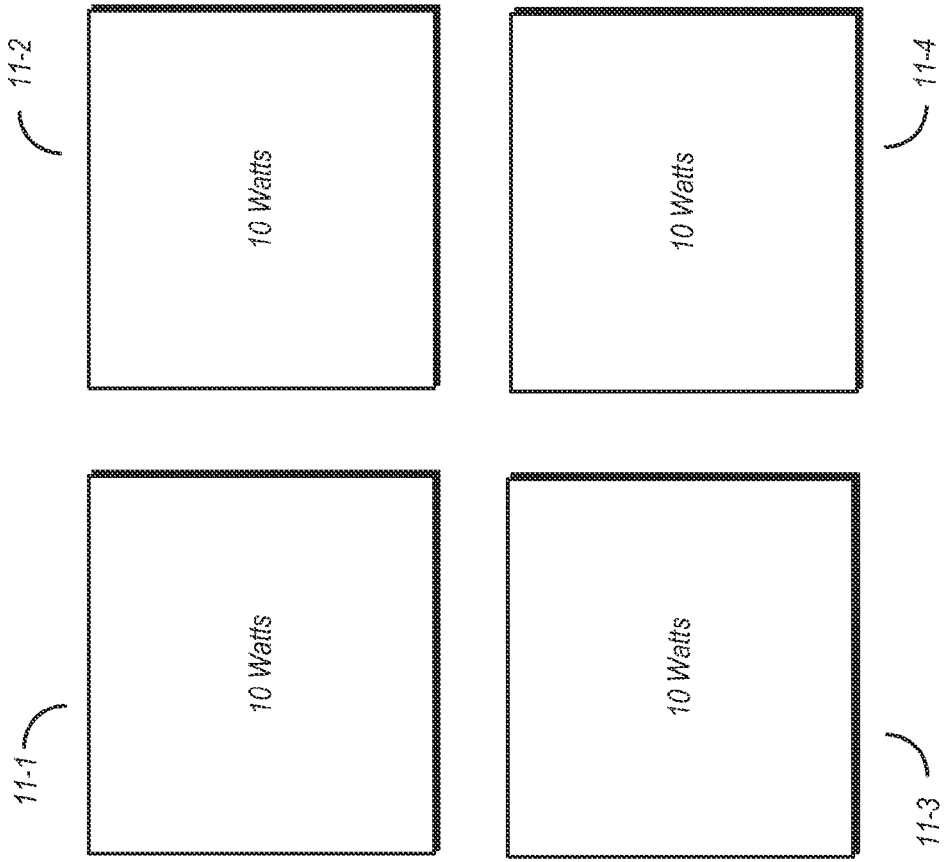
FIG. 3A is a block diagram illustrating thermal design power allocation in a first situation for one embodiment of a multi-core processor.

In FIG. 3A, all processor cores 11 are active and executing a processing workload. In the embodiment shown, the global power limit is 40 watts. Since each of the four-processor cores 11 in this embodiment is active, thermal control unit 21 may assign a local power limit of 10 watts to each, thereby evenly distributing local power limits. If the embodiment shown is an ACPI-compliant embodiment conforming the figures presented in Table 1 above, the maximum clock frequency for any of processor cores 11 may be 2.0 GHz, although intermittent boosts of up to 3.2 GHz may be permitted. Using the exemplary figure of 28° C. as an ambient temperature upon which the local power limit values are based, each of processor cores 11 may operate at 2.0 GHz with the intermittent boosts of 3.2 GHz in a deterministic, repeatable manner for environments in which the ambient temperature is less than 28° C. If the ambient temperature is greater than 28° C., the configuration shown in FIG. 3A may still be permitted, although some throttling (e.g., as described in reference to FIG. 2) may occur.

Figure 3B:
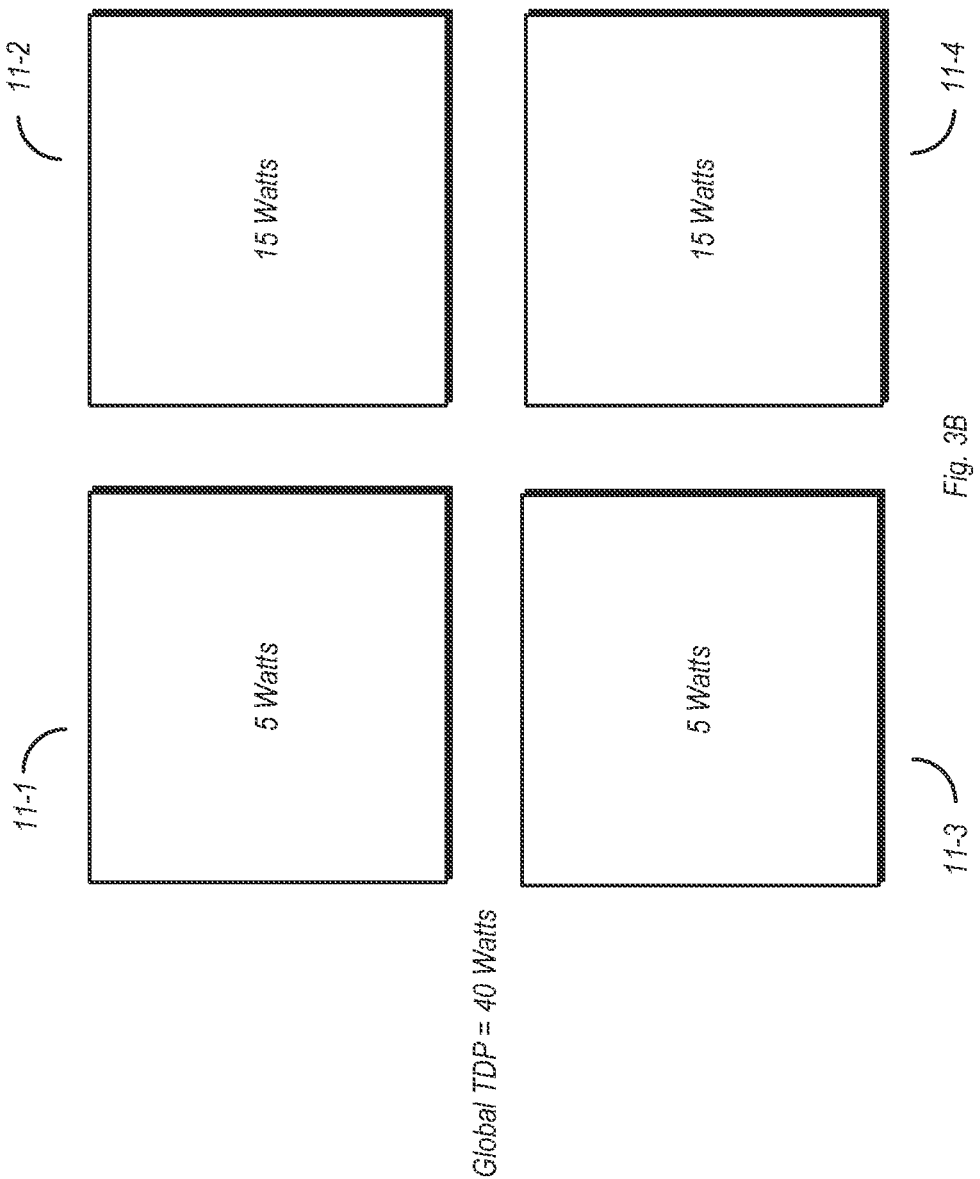
FIG. 3B is a block diagram illustrating thermal design power allocation in a second situation for one embodiment of a multi-core processor.

In FIG. 3B, two of processing cores 11 are idle, while the other two are active. The idle processor cores in this example may be clock-gated (i.e. the clock signal to these cores is inhibited) but not power-gated. Accordingly, the local power limit for the active cores may be set at 15 watts each. The 15 watt local power limit for the two active processor cores 11 may enable a performance boost via overclocking for these cores. In this particular example, each of the two active processor cores 11 may be operated at a clock frequency of up to 3.2 GHz. In low ambient environments (e.g., less than 28° C. for the exemplary embodiment discussed herein), operation of the two active cores may be accomplished without the need for throttling due to exceeding local or global power limits. In higher ambient temperature embodiments (e.g., 28° C. or above in the exemplary embodiment), operation of one or both of the active processor cores 11 at 3.2 GHz may result in some throttling.

It is noted that even when performance boosting is enabled for an active processor core 11, the actual clock frequency of operation may also depend on its processing workload. For example, if the processing workload for an active processor core in the example of FIG. 3B is compute-bounded, the clock frequency may be increased to 3.2 GHz. However, if the processing workload for an active processor core 11 in the example of FIG. 3B is memory-bounded (and thus not sensitive to the core clock frequency), the core may be operated as a significantly lower clock frequency, since increasing it in this situation would not result in any appreciable performance gain.

With respect to the clock-gated processor cores, the 5 watt local power limit for each of these may provide a margin of power should an event occur that causes one or both of these cores to enter an active state. Furthermore, the two idle processor cores 11 may act as a thermal sink with respect to the two active cores. In some embodiments, the assignment of local power limits to the various processor cores 11 may depend on the geometry of the layout on the IC die upon which the cores are implemented. For example, if an active core is located physically adjacent to an idle core, its local power limit may be greater than if it is located physically adjacent to another active core.

Figure 3C:
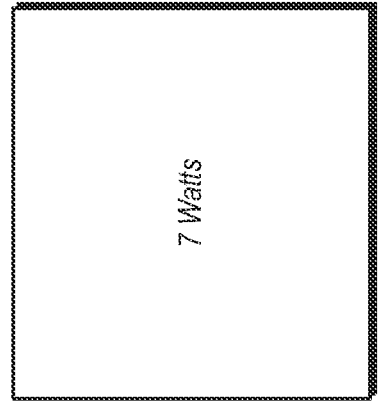
FIG. 3C is a block diagram illustrating thermal design power allocation in a third situation for one embodiment of a multi-core processor.
Figure 3C:
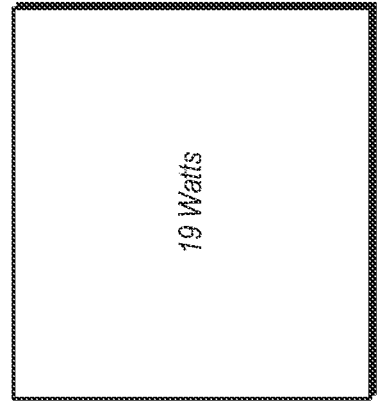
Figure 3C:
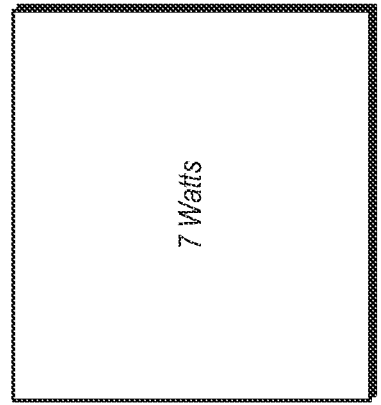
Figure 3C:
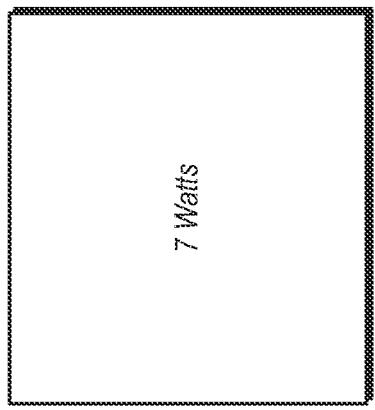

In the example of FIG. 3C, three of processor cores 11 are in an idle (clock-gated) state, while one of processor cores 11 is active. In this case, the active processor core 11 may be assigned a local power limit of 19 watts, and may be overclocked to a frequency of up to 3.6 GHz. At a clock frequency of 3.6 GHz, the active processor core 11 may operate within its assigned local power limit for ambient temperatures below a specified value (e.g., the 28° C. value mentioned above). Above the specified value, operating at a clock frequency of 3.6 GHz may result in some throttling of the active processor core 11.

Figure 3D:
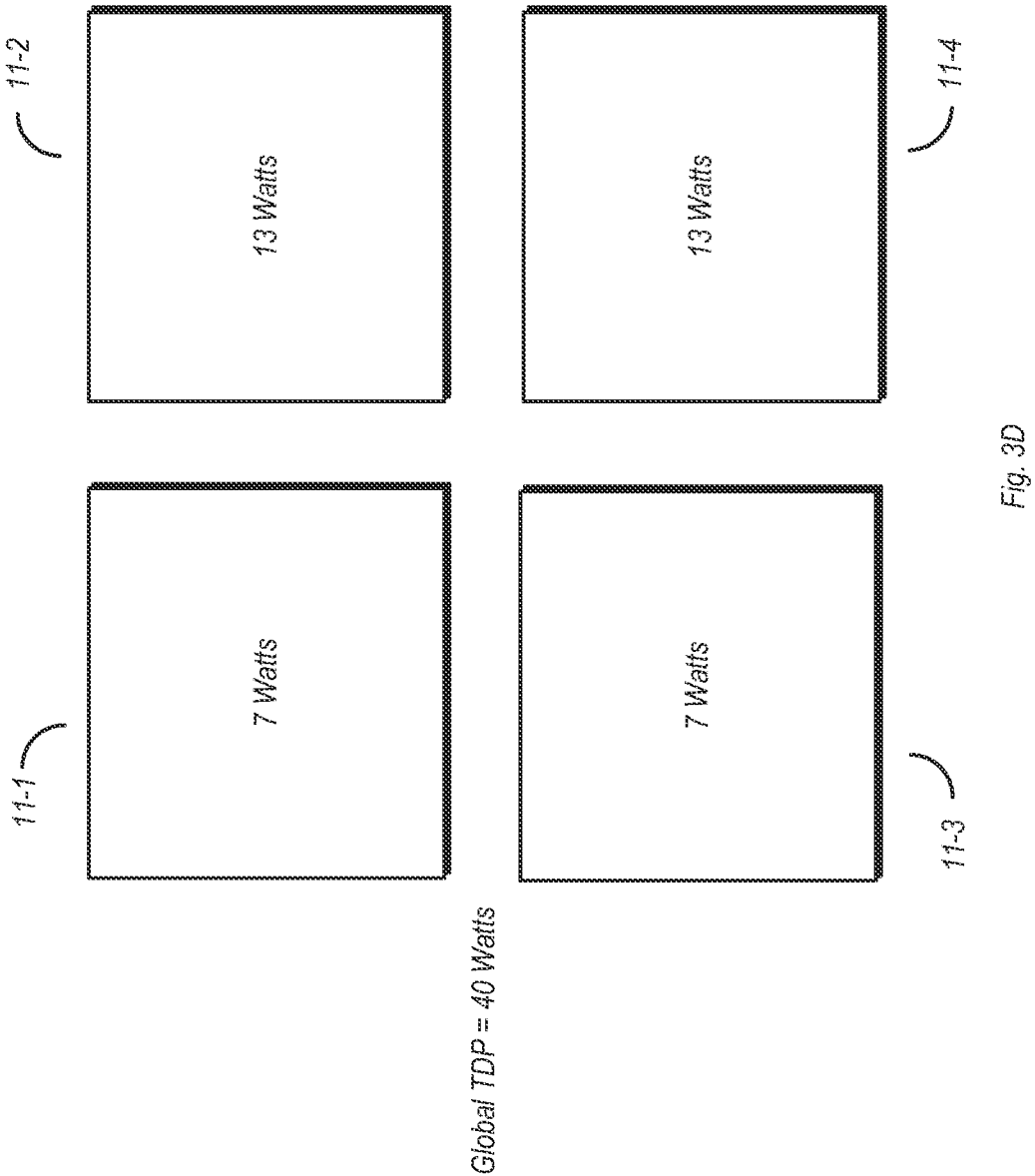
FIG. 3D is a block diagram illustrating thermal design power allocation in a fourth situation for one embodiment of a multi-core processor.

FIG. 3D illustrates a situation that is similar to that of FIG. 3B, wherein two processor cores 11 are idle, while the other two are active. For the active processor cores 11, a local power limit of 13 watts each may be assigned. The active processor cores 11 may operate at a clock frequency of up to 3.4 GHz in this example, compared to a maximum clock frequency of 3.2 GHz for the example of FIG. 3B.

The difference between the local power limit values in this example in comparison to the example of FIG. 3B may be a result of one or more of a number of different factors. One such factor is the layout geometry of the IC die upon which the processor cores 11 are implemented. For example, in the example shown in FIG. 3B, the two active processor cores 11 may each be physically adjacent to an idle processor core 11, but not to each other. In contrast, the two active processor cores 11 in the example of FIG. 3D may be physically adjacent to one another. Accordingly, in the example of FIG. 3B, the heat generated by the active processor cores 11 may be more easily dissipated than in the example of FIG. 3D.

The lower local power limits on the active processor cores 11 in the example of FIG. 3D in comparison to that of FIG. 3B may provide for tighter thermal control of each of the active cores 11. Thus, if operating in an environment with a high ambient temperature, thermal control unit 21 may be quicker to perform PNTC throttling (as discussed above in reference to FIG. 2) for the active cores 11 due to the lower local power limit relative to that of FIG. 3B. This may make it less likely that global (HTC) throttling (as also discussed above in reference to FIG. 2) will be necessary.

Figure 3E:
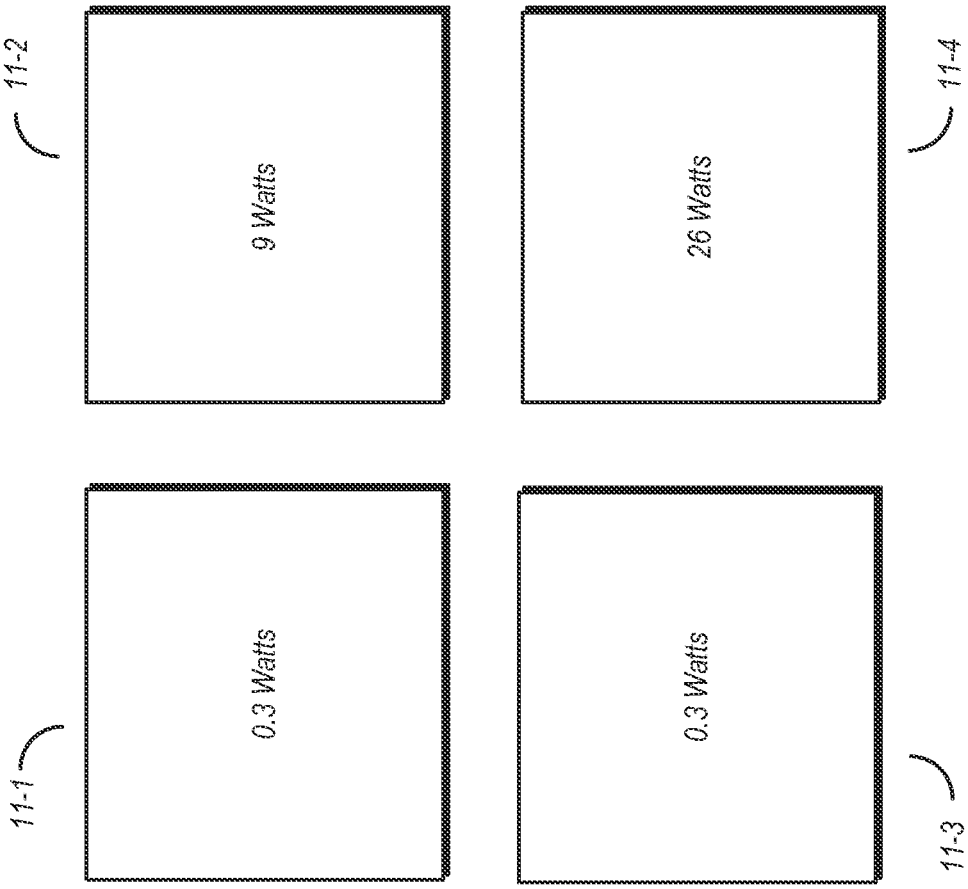
FIG. 3E is a block diagram illustrating thermal design power allocation in a fourth situation for one embodiment of a multi-core processor.

In the example of FIG. 3E, two processor cores 11 are power-gated (i.e. powered down), another processor core 11 is idle (clock-gated), while one processor core 11 is active. The active processor core 11 may be assigned a local power limit of 26 watts, with a maximum clock frequency of 3.9 GHz. It is noted that in this situation, the maximum power consumption adds up to 35.6 watts, which is less than the 40 watt global power limit. This difference may provide a guard band in the case where one of the idle or power-gated processor cores enters an active state due to a wake-up event.

Figure 3F:
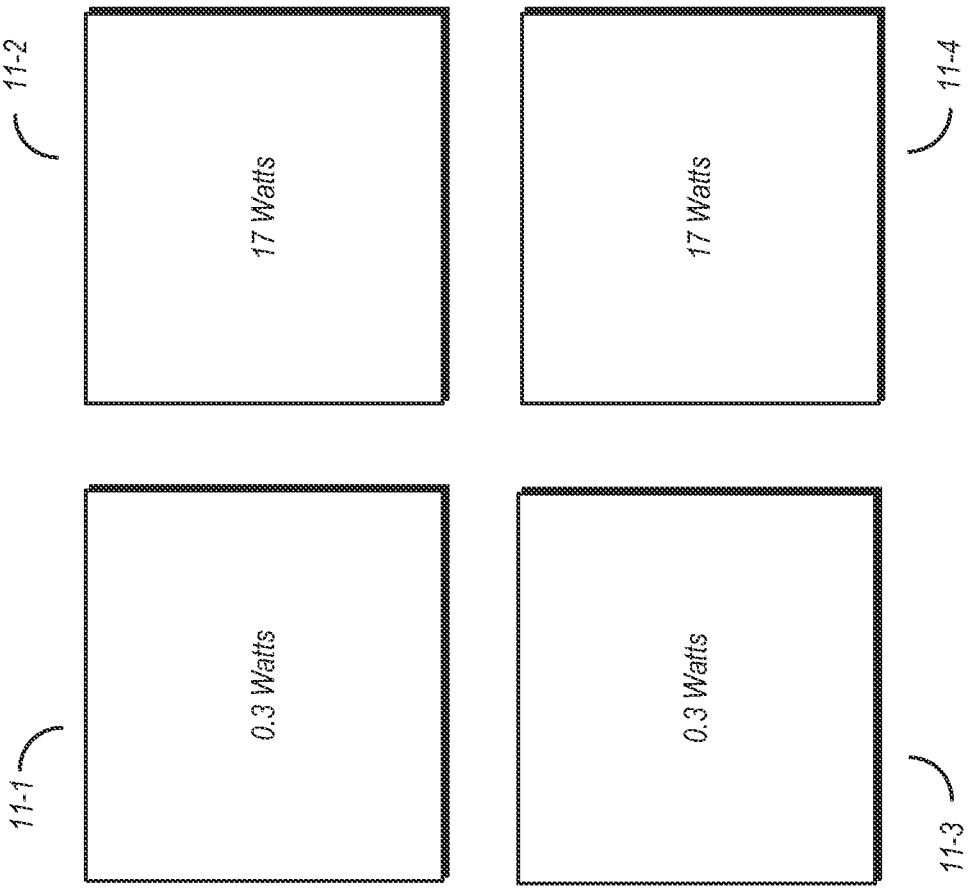
FIG. 3F is a block diagram illustrating thermal design power allocation in a fifth situation for one embodiment of a multi-core processor.

In FIG. 3F, two processor cores 11 are power-gated, while the remaining two are active. In this case, the active processor cores 11 are each assigned a local power limit of 17 watts, with a maximum clock frequency of 3.8 GHz. The maximum power consumption in this case adds up to 34.6 watts, which is again less than 40 watt global power limit. As with the example of FIG. 3E, the difference between the total amount of assigned local power limits and the global power limit may allow a guard band in the case where one of the idle or power-gated processor cores enters an active state due to a wake-up event.

Figure 4:
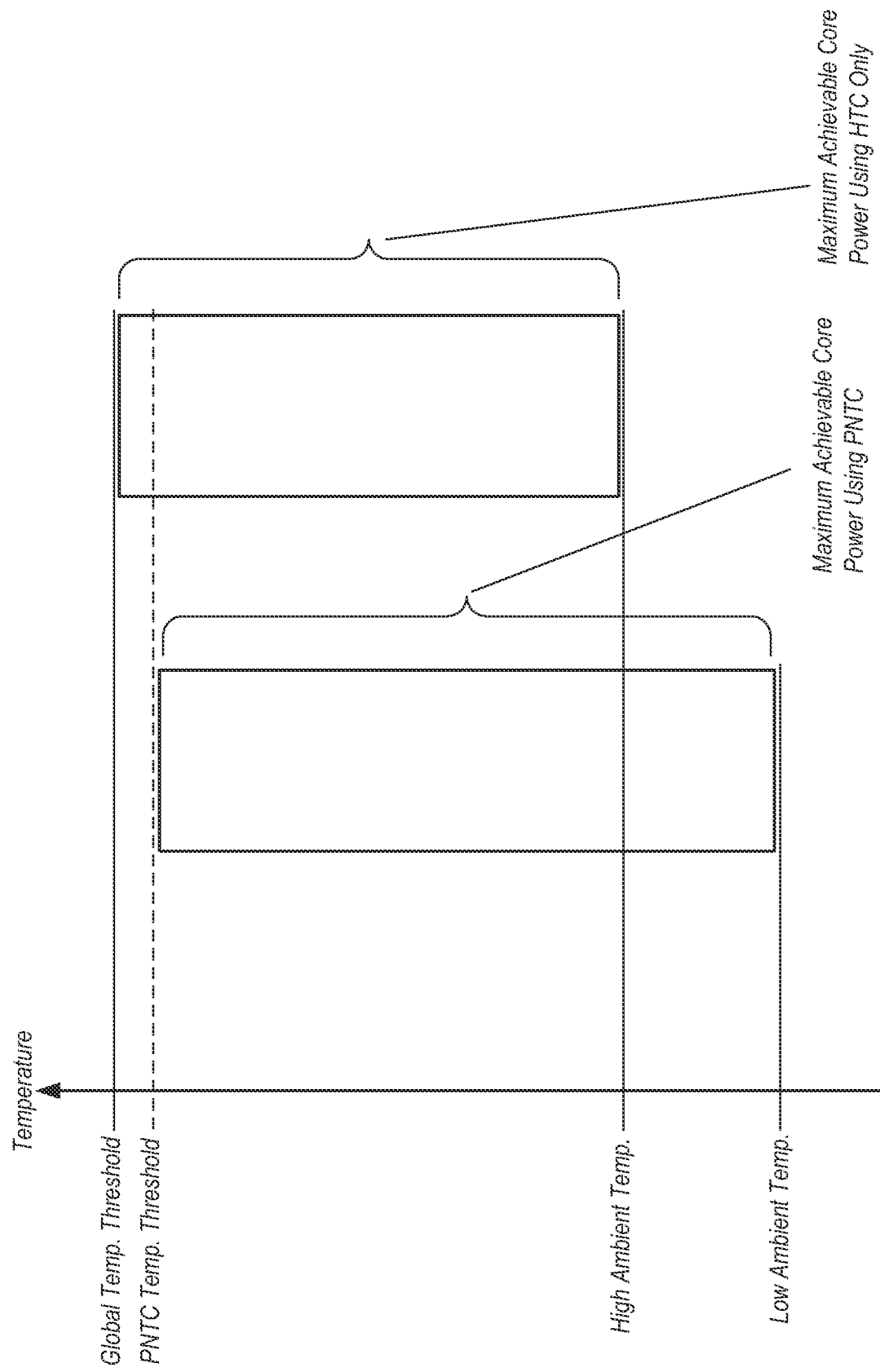
FIG. 4 is a graph illustrating the maximum core power that may be utilized under two different scenarios for one embodiment of a multi-core processor.

FIG. 4 is a graph illustrating the maximum core power that may be utilized under two different scenarios for one embodiment of a multi-core processor. More particularly, FIG. 4 illustrates the difference in maximum core power utilization that is achievable using PNTC, as opposed to an embodiment that utilizes only global HTC. On the left hand side of the graph, the maximum core power for an embodiment configured for PNTC is illustrated. On the right hand side of the graph, the maximum core power for an embodiment configured for HTC only is illustrated. Since the local power limits applied to the processor cores utilizing PNTC is based on a lower ambient temperature than for the global power limit, additional power may be consumed on a per-core basis in the PNTC embodiment. This may in turn allow for performance boosting of the processor cores to utilize the extra power available. As discussed above, this performance boosting may be accomplished by increasing the core clock frequency beyond its maximum frequency of a highest specified operating point (e.g., to a value greater than the maximum frequency specified in the ACPI-compliant embodiment exemplified in Table 1). Increasing the clock frequency in such a manner is known as overclocking. If a workload demand on given processor core justifies such a frequency increase commensurate with overclocking, the processor core may be enabled to execute that workload faster than might otherwise be achievable in an embodiment that relies solely on globally-applied HTC.

Figure 5:
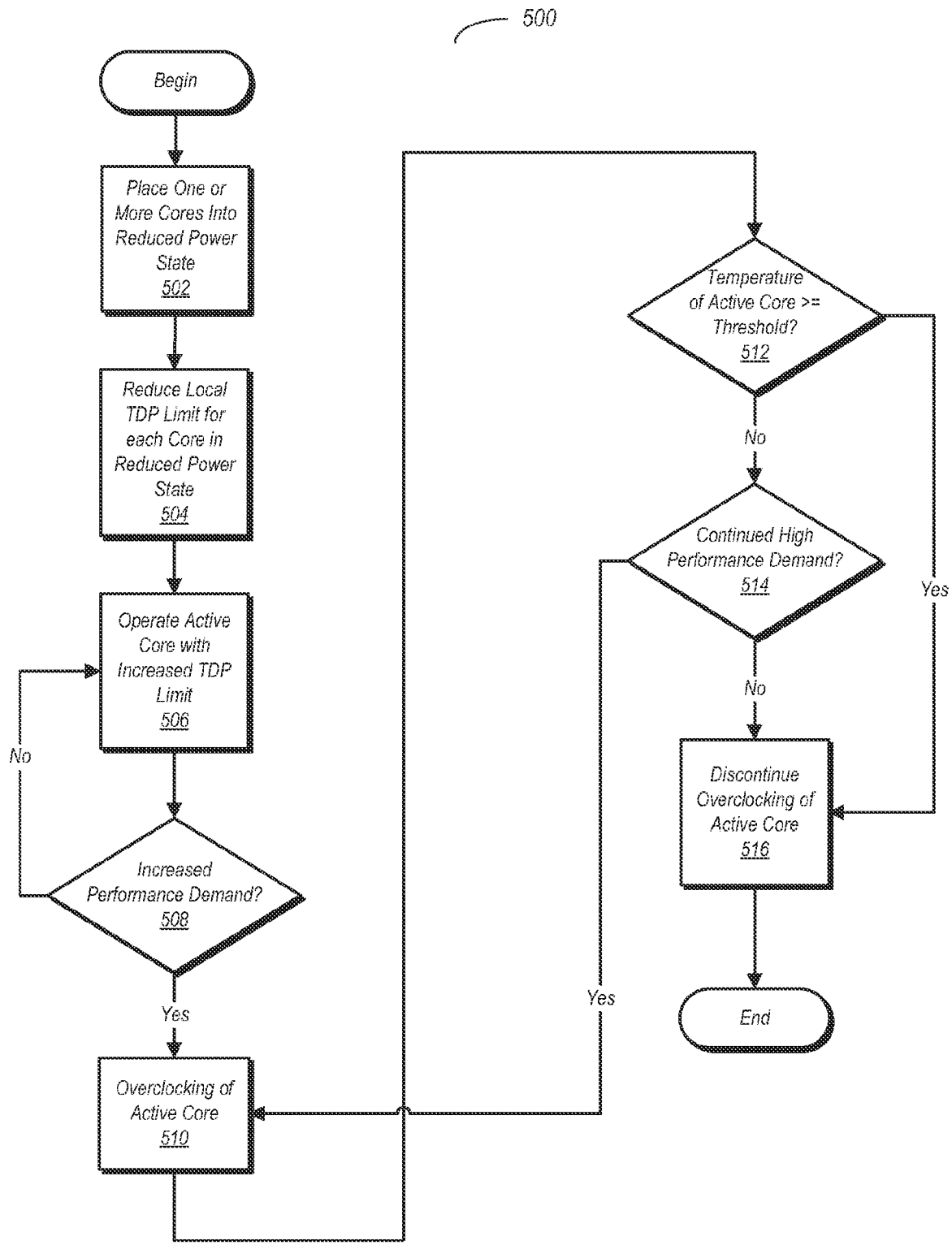
FIG. 5 is a flow diagram of one embodiment of a method for boosting performance of a processor core based on thermal design power (TDP) of individual cores.
Figure 6:
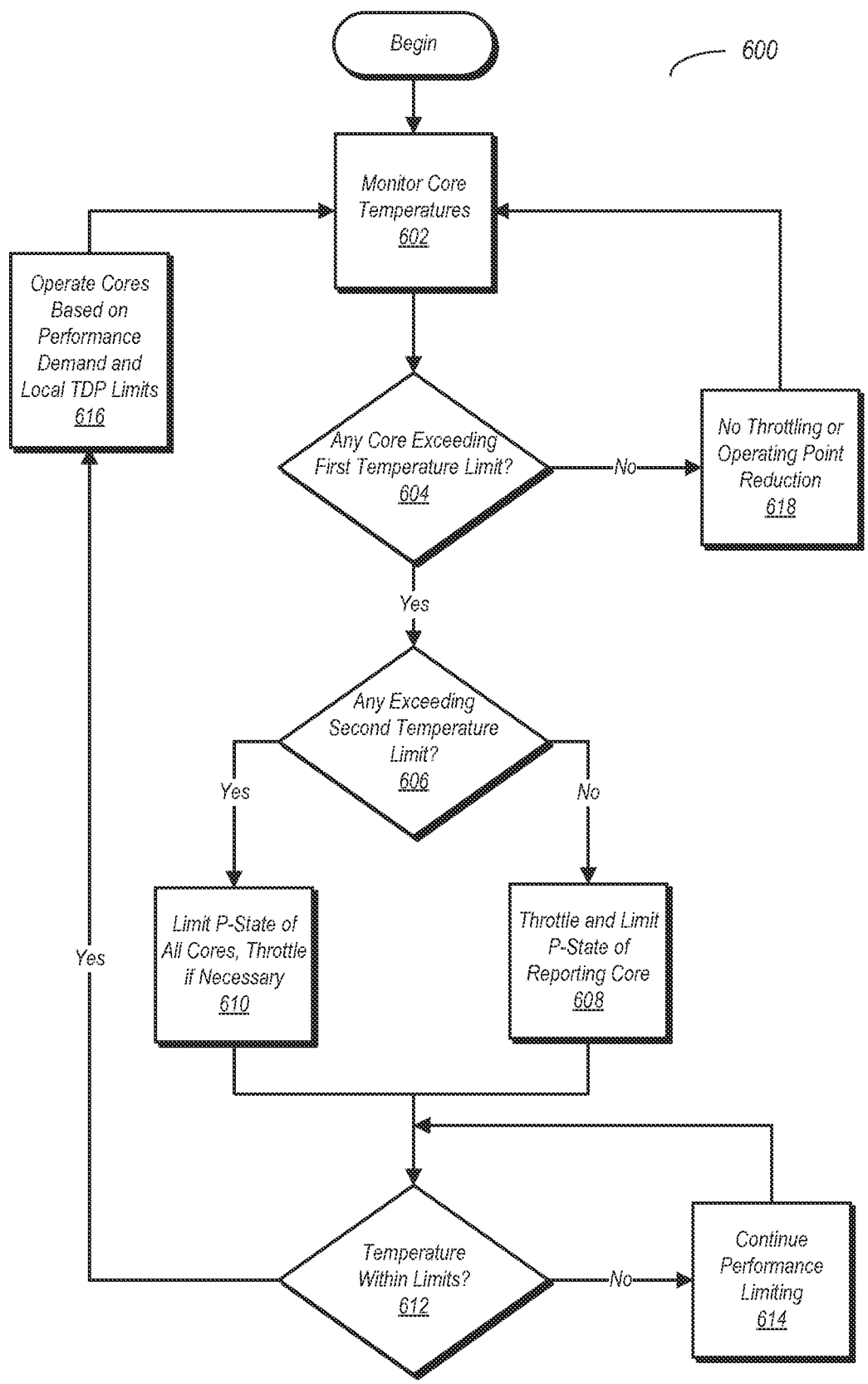
FIG. 6 is a flow diagram of one embodiment of a method for using both per node thermal control and global thermal control.

Method Embodiments:

FIGS. 5 and 6 illustrate embodiments of various methods that may be utilized in a multi-core processor configured for PNTC. FIG. 5 is a flow diagram of one embodiment of a method for boosting performance of a processor core based on a local power limit in a PNTC processor embodiment. FIG. 6 is a flow diagram of one embodiment of a method for using both PNTC and global HTC in a multi-core processor.

Method 500 of FIG. 5 begins with the placing of one or more inactive processor cores into a reduced power state (block 502). The reduce power state may be a clock-gated state or a power-gated state. In the clock-gated state, the clock signal may be inhibited from being provided to the cores placed in the reduced power state, although the operating voltage may continue to be provided. In the power-gated state, neither the clock signal nor operating voltage is provided to the cores placed in a reduced power state. In addition to placing the inactive processor cores in a reduced power state, their respective local power limits may also be reduced (block 504).

One or more processor cores that remain active may each continue to operate with an increased local power limit (block 506). The local power limits for the remaining active processor cores may be increased responsive to the reduction of the local power limits of those cores placed in a reduced power state. If the performance demand for the active core does not increase or is otherwise relatively low (block 508, no), then the cores may continue to operate at their current operating point. However, if the performance demand for a remaining active core increases or is otherwise relatively high (block 508, yes), the increase in the local power limit may allow for increasing the operating point to maximize performance. In the embodiment shown, this may be achieved by overcooking each active core having a high or increased performance demand (block 510). Overclocking may be performed for compute-bounded processor workloads and more generally, for workloads whose performance is sensitive to the core clock frequency.

Overclocking may continue for an active processor core under two conditions. The first of these conditions is that the highest temperature reported for that core remains less than a first temperature threshold that is used for PNTC (e.g., see graph in FIG. 2 above). If the temperature remains below the first threshold (block 512, no), and the performance demand of the processor workload remains high enough to justify the higher operating point (block 514, yes), then overclocking may continue (block 510). If a reported temperature from an overclocking processor core meets or exceeds the first threshold value (block 512, yes) or the workload demand decreases to a point where overclocking provides no performance advantage (block 514), then overclocking may be discontinued (block 516). In the case where overclocking is discontinued due to exceeding the first temperature threshold (block 512, yes), throttling of the reporting core (as described above with reference to FIGS. 1 and 2) may be performed. In one ACPI-compliant embodiment, this throttling may limit the operating point of the reporting core to one having a clock frequency that is 90% that of the P0 state.

The flow diagram of FIG. 5 illustrates a single iteration of the method to which it pertains. However, it is noted that this method may be repeated as many times as necessary during the operation of the processor in which PNTC is utilized.

FIG. 6 is a flow diagram illustrating the use of both PNTC and HTC on the same processor. In the embodiment shown, method 600 begins with the monitoring of reported temperatures for each of a number of processor cores (block 602). The monitoring of reported temperatures may include comparing these values to first and second threshold values, such as those shown in the graph of FIG. 2. If no reported temperature on the IC die is greater than or equal to either of the first and second threshold (block 604, no), then no throttling or other power reduction action is performed (block 618) responsive to the temperature readings. However, it is noted that decreases in respective operating points for the various processor cores may occur responsive to reduced workload demands. Such operating point decreases may include clock-gating and power-gating of the processor cores for which the performance demand is reduced.

If a temperature reported from a given core meets or exceeds the first temperature threshold (block 604, yes), but no core is reporting a temperature meeting or exceeding the second temperature threshold (block 606, no), then the given core may be throttled and its operating point (e.g., P-state) limited (block 608). The first temperature threshold may be used in performing thermal control on a per node basis (PNTC), while the second temperature threshold may be used in performing thermal control on a global basis (HTC).

In some embodiments, the operating point is limited only for the reporting core. In other embodiments, all cores may be limited in operating point in the same manner as the reporting core. Further still, some embodiments may allow for a partial limiting of the operating point. For example, in an embodiment wherein a voltage plane is shared among all cores, the operating voltage for all cores may be limited to a specified value (e.g., 90% of the operating voltage for the P0 state of FIG. 1), while the clock frequencies for the non-reporting cores are not limited.

If any reported temperature meets or exceeds the second temperature threshold (block 606, yes), then a global throttling and limiting of core operating points may be performed (block 610). Referring again the example of FIG. 2 and Table 1, in one embodiment, the operating point for all cores may be limited to 50% of the clock frequency of the P0 state, i.e. an operating point that corresponds to the P3 state. The operating voltage may be similarly limited to that specified by the P3 state. Those processor cores operating at a clock frequency that is greater than that specified by the P3 state may be throttled responsive to the reported temperature being greater than or equal to the second temperature threshold. Those processor cores operating at a clock frequency and operating voltage equal to or less than that of the P3 state may continue operating at their respective operating points, although these cores may not respond to an increased workload demand by increasing to an operating point higher than the P3 state while the operating points for all cores remain limited.

After reducing the operating point for one processor core (using PNTC) or for all processor cores (using globally applied HTC), the temperatures may continue to be monitored. If the reported temperatures are not below the first and second temperature threshold values (block 612, no), then operating point limiting may continue (block 614). If all temperatures are within limits (block 612, yes), then the processor cores may be operated based on respective performance demands and respective local power limits, (block 616), without limiting the operating point to a state that is less than the maximum specified.

It is noted however that subsequent to a throttling action responsive to a reported temperature that is greater than or equal to one of the first or second temperature thresholds, operating point limiting may continue for a time thereafter to allow for additional cooling of the IC. An embodiment utilizing a third temperature threshold is thus contemplated. In such an embodiment, the third temperature threshold may be less than either of the first or second temperature thresholds. Subsequent to an operating point reduction utilizing either PNTC or HTC, one or more of the processing cores may continue to be limited until one or more reported temperatures falls below a the third temperature threshold. For example, if a single core is throttled and/or limited in operating point using PNTC responsive to reporting a temperature exceeding the first temperature threshold, that core may continue to be operating point limited until its maximum reported temperature falls below the third threshold.

Figure 7:
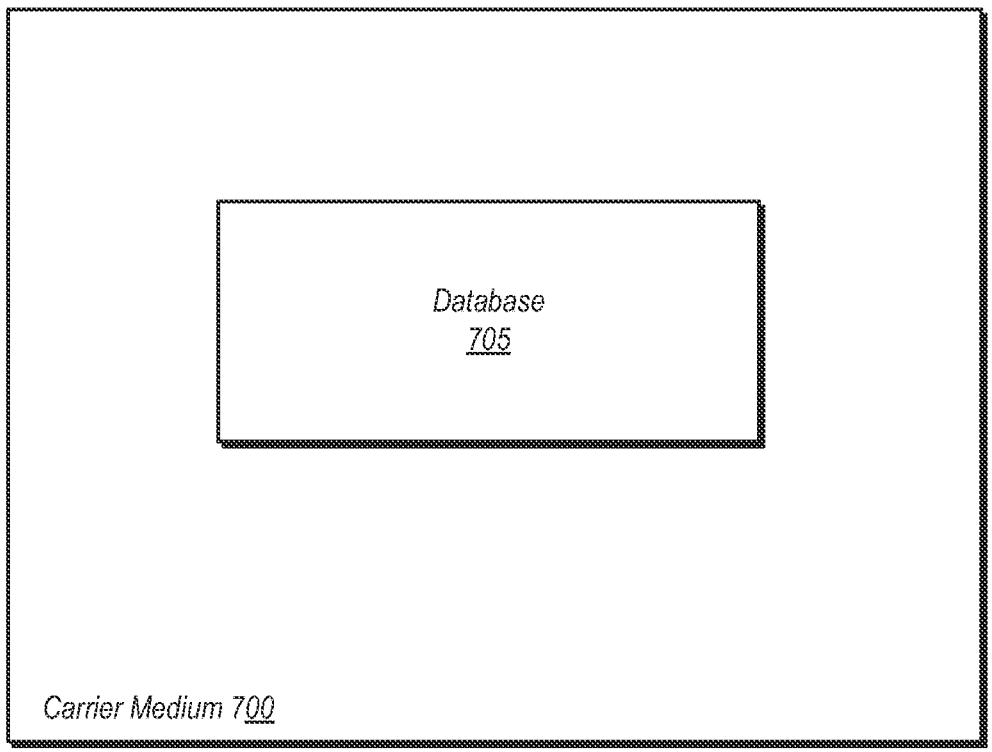
FIG. 7 is a block diagram of one embodiment of a computer readable medium including a data structure describing an embodiment of circuitry including a power management unit.

Computer Accessible Storage Medium:

Turning next to FIG. 7, a block diagram of a computer accessible storage medium 700 including a database 705 representative of the system 10 is shown. Generally speaking, a computer accessible storage medium 400 may include any non-transitory storage media accessible by a computer during use to provide instructions and/or data to the computer. The storage medium 400 may include program instructions executable by at least one processor of a computer system to perform steps of an algorithm or a method created by a software programmer. For example, a computer accessible storage medium 400 may include storage media such as magnetic or optical media, e.g., disk (fixed or removable), tape, CD- ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the data 705 representative of the system 10 carried on the computer accessible storage medium 700 may be a database or other data structure which can be read by a program and used, directly or indirectly, to fabricate the hardware comprising the system 10. For example, the database 705 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database 705 on the computer accessible storage medium 700 may be the netlist (with or without the synthesis library) or the data set, as desired, or Graphic Data System (GDS) II data.

While the computer accessible storage medium 700 carries a representation of the system 10, other embodiments may carry a representation of any portion of the system 10, as desired, including IC 2, any set of agents (e.g., processing cores 11, I/O interface 13, power management unit 20, etc.) or portions of agents (e.g., thermal control unit 21, etc.).

Adaptive Power Management Using Interface Limits:

As previously discussed, an integrated circuit (IC) may include multiple components. In some embodiments, the multiple processing nodes are included on a single die, such as within a system-on-a-chip (SOC). The multiple components may include multiple processing nodes, wherein a processing node may be defined as any type of functional unit that performs processing. Examples of processing nodes include a processor core of a general-purpose computer processor, a single-instruction-multiple-data (SIMD) core, such as a graphics processing unit (GPU), a digital signal processor (DSP), and the like; or other type of processing circuitry.

Referring again to FIG. 1, an IC with multiple components is shown. In addition to the multiple processing nodes, the multiple components may include a communications hub, such as the north bridge 12. Further, the multiple components may include one or more interfaces to external devices. Examples of the interfaces may include the input/output (I/O) interface 13 for various peripheral devices, the memory controller 18, and a display graphics interface that includes the GPU 14. Other remaining components on the IC may include the PLL 4, the voltage regulator 5, and so forth.

Generally speaking, software controls the multiple components within the IC, such as a SOC. Power-performance states (p-states), power management state transitions, clock gating and the like may be controlled by software. The algorithms implemented by the software may focus at a level of granularity of a given component, rather than focusing on the IC in its entirety. In addition, the software reacts with a significant delay, such as tens of milliseconds, when adjusting operating states and control signals of the multiple components. Therefore, hardware, such as the power management unit 20, may be used to dynamically adjust the p-states of the multiple processing nodes based on CPU-centric activity, GPU-centric activity, and detected temperature overages. However, the other components on the IC additionally contribute to the power consumption of the IC. In order for the power management unit 20 to accurately monitor the power consumption on the IC, monitoring the power consumption of the other components is performed.

Utilizing a power calculation mechanism within each of the other components on the IC may include significant design complexity. In fact, the power consumption may be inaccessible or incalculable. Additionally, a third party supplier may perform the calculation or the supplied power calculation may have a questionable accuracy. Any power calculation may include some amount of a guard-band, which may prevent an unexploited amount of the power limits to be transferred to another processing node.

An alternative approach includes setting the power consumption for each of the other components, such as the interfaces to external devices, to a respective relatively high power consumption value. The relatively high power consumption value may be a de-rated TDP value. This initial power consumption value may be set sufficiently high to guard-band against temperature overages on the IC. The relatively high initial power consumption values may limit performance responsive to at least the interfaces do not typically operate at these initial values used by logic within the power management unit 20. For example, the I/O interface 13 may typically consume 30 mW. This value may not be easily obtainable for the power management unit 20. Therefore, the logic within the power management unit 20 may utilize a guard-band value of 200 mW for the I/O interface 13. The use of the guard-band values by the logic may lead to more frequent performance throttling of the multiple processing nodes.

The relatively high initial power consumption values for the interfaces to external devices may be used by the power management control logic. The relatively high initial power consumption values may be used as guard-bands to prevent temperature overages since the actual power consumption values may be difficult to obtain. The difficulty may arise from the low confidence of third party power calculations or complete unavailability of power consumption values from third party suppliers. For example, a power calculation for the I/O interface 13 may not be available with particular versions of universal serial bus (USB) based configurations or in configurations with other third party interface controllers.

The relatively high values being used by power management control logic regardless of how different they are from the actual power consumption may indicate the power limits for the processing nodes may not be increased. Although the actual power limit for a given interface is relatively small, one or more of the processing nodes may not have its respective power limit increased based on the relatively small interface power limit. The prevention of increasing the power limits for the processing nodes may arise from the power management control logic using the relatively high guard-band initial interface power consumption value. As a result, performance may be reduced for both CPU-centric and GPU-centric workloads.

Referring now to FIG. 8, one embodiment of a power budgeting table 800 is shown. Table 800 illustrates an example of allocated power limits for components on an IC, such as a SOC. In the example shown, the components are grouped into the communication hub, such as the north bridge 12; the processing nodes, such as the general-purpose cores and any SIMD cores; the display graphics interface; the memory controller; the I/O interface; and the remaining component, such as the PLL, the voltage regulator, and so forth. The listed components have allocated initial power limits. For example, the communication hub is allocated an initial power limit of 900 mW, the processing nodes are allocated an initial power limit of 800 mW, and so forth.

Taking the I/O interface 13 as an example, the I/O interface 13 may consume between 30 mW and 400 mW during operation. The 30 mW value may be associated with the I/O interface 13 operating in a power gating state, such as when multiple device interfaces within the I/O interface 13 have been idle for an appreciable amount of time. The 400 mW value may be associated with intense user activity on the device interfaces within the I/O interface 13. The device interfaces may include USB, SATA, and other interface streams. The I/O interface 13 may consume 100 mW during typical CPU-centric and GPU-centric workloads. A guard-band power limit of 200 mW may be selected for these typical workloads to prevent temperature overages. Table 800 illustrates the guard-band power limit of 200 mW is selected as an initial power limit for the I/O interface. The guard-band power limit of 200 mW may cause logic within the power management unit 20 to throttle the processing nodes more frequently although the I/O interface 13 may be consuming 100 mW or less.

An alternative approach to the above guard-banding approach may be to allocate an initial low power limit to components that do not have available or reliable dynamic reporting of power consumption or for cost or power saving reasons. Examples of these types of components without reliable reporting may include at least the I/O interface, the display graphics interface, the memory controller, and so forth. For example, rather than use the guard-band power limit of 200 mW as shown in table 800 for the I/O interface 13, the low power limit of 30 mW may be selected for the initial power limit for the I/O interface 13. Alternatively, another low power limit, such as 60 mW or twice the idle state low power limit of 30 mW, may be selected. Other values for the initial low power limit are possible and contemplated.

In the case of using 30 mW as an initial power limit for the I/O interface 13, the 170 mW difference between the guard-band power limit of 200 mW and the low power limit of 30 mW may be allocated to the multiple processing nodes. Therefore, a respective initial power limit for one or more of the multiple processing nodes may be increased based at least on the initial low power limit for the I/O interface 13.

The increased power limit for the one or more processing nodes may allow for both higher power consumption and higher performance for the multiple processing nodes. During operation across workloads, control logic within the power management unit 20 may monitor an amount of thermal throttling of the multiple processing nodes during a given time interval. An example of thermal throttling may include transitioning a p-state of a given processing node to a lower performance and lower power p-state. The control logic within the power management unit 20 may throttle a given processing node in response to detecting a temperature reading from a sensor near or within the given processing node exceeds a respective threshold.

Continuing with the above example, the control logic within the power management unit 20 may maintain a count of throttling for each of the plurality of processing nodes during operation. Responsive to determining a count of throttling exceeds a first threshold within a time interval for the given processing node, the control logic within the power management unit 20 may reduce the power limit for the given processing node. Additionally, the control logic may increase the power limit of at least one of the one or more interfaces based at least on the reduction of the power limit of the given processing node. For example, user activity may activate multiple I/O streams during CPU-centric and/or GPU-centric workloads. The power management unit 20 may begin throttling one or more processing nodes. The power management unit 20 may adjust power limits for the one or more throttled processing, such as decreasing the power limits, and increase the power limit for the I/O interface 13. Further details are provided shortly.

Figure 9:
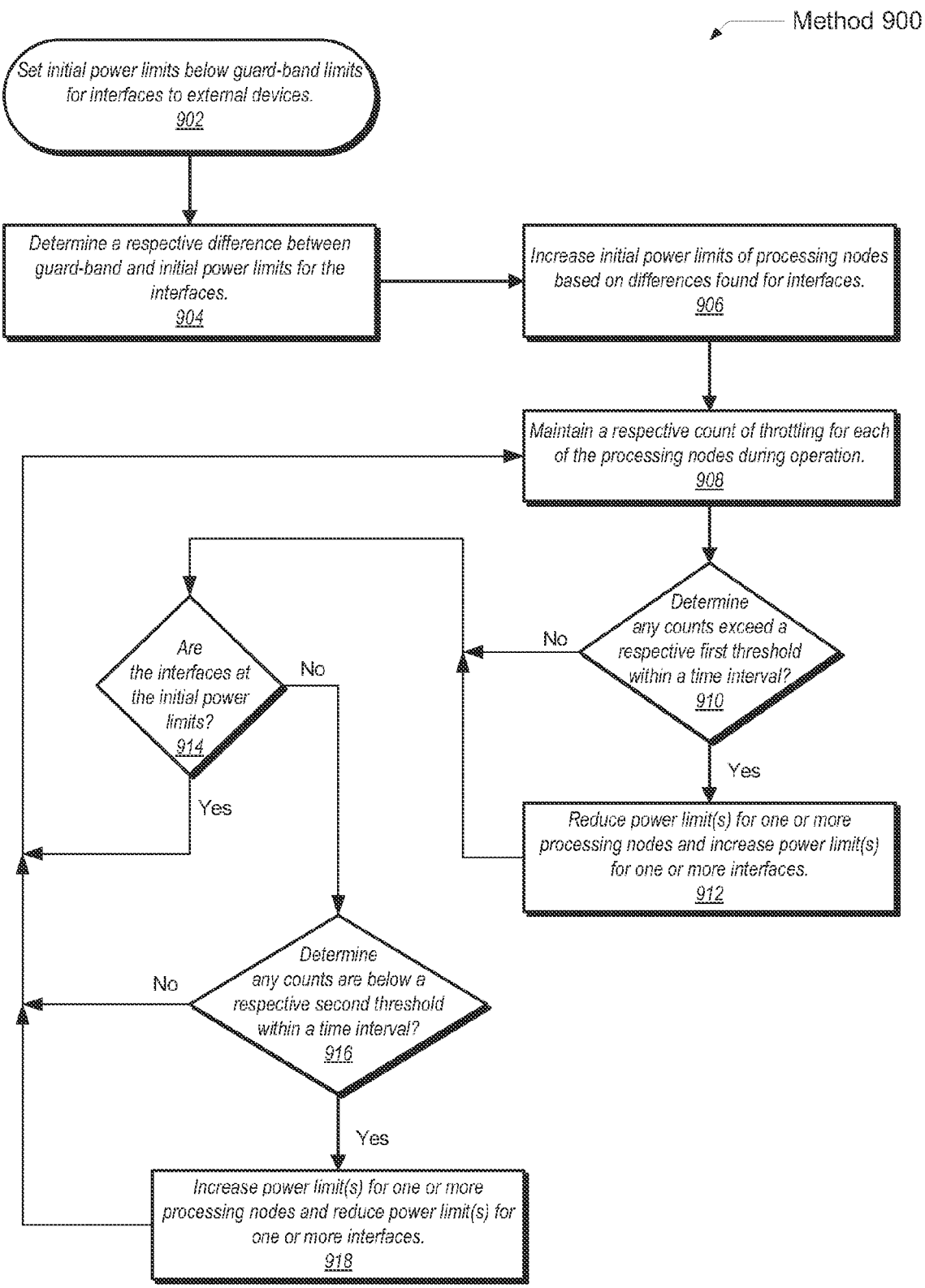
FIG. 9 is a flow diagram of one embodiment of a method for dynamically adjusting power limits for components on an integrated circuit.

Referring now to FIG. 9, a generalized flow diagram of one embodiment of a method 900 for dynamically adjusting power limits for components on an IC is shown. For purposes of discussion, the steps in this embodiment are shown in sequential order. However, in other embodiments some steps may occur in a different order than shown, some steps may be performed concurrently, some steps may be combined with other steps, and some steps may be absent.

In block 902, initial power limits are set below guard-band power limits for at least interfaces to external devices. Components that do not have available or reliable dynamic reporting of power consumption may have initial power limits set in this manner. For example, an initial low power limit of 30 mW may be set for the I/O interface 13, rather than the guard-band power limit of 200 mW. In block 904, a respective difference between guard-band and initial power limits for these components, such as the interfaces to external devices, may be determined. For example, a difference of 170 mW may be determined for the I/O interface 13 since the guard-band power limit is 200 mW and the low power limit is 30 mW.

In block 906, the initial power limits of one or more processing nodes may be increased based on the differences between the guard-band and the set initial power limits for components such as the interfaces. The increased power limit for the one or more processing nodes may allow for both higher power consumption and higher performance for the multiple processing nodes.

In block 908, a respective count of throttling for each of the processing nodes during operation may be maintained. The power management unit 20 may throttle a given processing node in response to detecting a temperature reading from a sensor near or within the given processing node exceeds a respective threshold. The power management unit 20 may maintain a count of throttling for each of the plurality of processing nodes during operation for a given time interval. At the end of the given time interval, each count may be reset for the next time interval. Reset values may include zero or a value based on the last one or more counts.

If any counts exceed a respective first threshold within a time interval (conditional block 910), then in block 912, the power limit for one or more processing nodes may be reduced. The one or more processing nodes may include at least the processing node with the excessive count. Additionally, the power limit for one or more components, such as the interfaces, may be increased. The amounts of the power limit increases and reductions for the processing nodes and interfaces, respectively, may be based on programmable amounts, a given percentage of a maximum power limit, a given percentage of the guard-band power limit, a given percentage of a global power limit, or another amount.

If the power limit of a component without reliable power reporting, such as an interface, is not at its initial low power limit (conditional block 914), then a determination may be made whether the count is below a second threshold. If any counts are below a respective second threshold within a time interval (conditional block 916), then in block 918, the power limit for one or more processing nodes may be increased. The one or more processing nodes may include at least the processing node with the low count.

In some embodiments, the second threshold is the same as the first threshold. In other embodiments, the second threshold may be less than the first threshold and selected in a manner to introduce hysteresis to the power limit transitions. Additionally, the power limit for one or more components, such as the interfaces, may be reduced. Again, in some embodiments, the amounts of the power limit increases and reductions for the processing nodes and interfaces, respectively, may be based on programmable amounts, a given percentage of a maximum power limit, a given percentage of the guard-band power limit, a given percentage of a global power limit, or another amount. In other embodiments, the power limit for selected interfaces returns to its initial low power limit.

In some embodiments, the parameters that include at least the initial power limits, throttling count thresholds, and power limit adjustment values are configurable on an individual component basis. In other embodiments, these parameters are configurable on a group basis, wherein a group includes two or more components. In some embodiments, in addition to or in place of the power limits, other values other than the power limits may be adjusted both during the initial configuration setting and during operation responsive to the maintained counts crossing thresholds. For example, the transistor leakage current used in calculations by the power management unit control logic may be adjusted. Typically, a conservative approach consists of scaling up the leakage current value for a thermal region or for a component based on a detected hot spot temperature. An accurate leakage calculation may be complicated due to high computational effort and accuracy. Using the above-described method 900 for leakage current adjustments may maximize performance while still identifying hot conditions and slowing down the system appropriately. For example, a best-case leakage value may be initially selected. During operation, the leakage value may be dynamically adapted based on the frequency of the performance and power throttling of the processing nodes.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system comprising:
   a plurality of processing nodes;
   one or more interfaces to external devices; and
   a power management unit configured to:
   increase a respective initial power limit for one or more of the plurality of processing nodes based at least on a respective initial power limit for the one or more interfaces;
   maintain a respective count of throttling for each of the plurality of processing nodes during operation, wherein a respective count of throttling comprises a count of transitions of a current performance state (p-state) of a corresponding processing node to a lower p-state responsive to detecting a corresponding temperature reading exceeds a temperature threshold for the corresponding processing node; and
   in response to a count of throttling exceeding a first threshold within a time interval for a given processing node of the plurality of processing nodes, reduce the power limit for the given processing node.

2. The system as recited in claim 1, wherein in response to the count of throttling exceeding the first threshold within the time interval for the given processing node, the power management unit is further configured to increase the power limit of at least one of the one or more interfaces based at least on the reduction of the power limit of the given processing node.

3. The system as recited in claim 2, wherein the power management unit is further configured to set the respective initial power limit for the one or more interfaces at a respective low power limit associated with an idle state rather than at a power limit associated with a guard-band state for typical use of the plurality of processing nodes.

4. The system as recited in claim 3, wherein the power management unit is further configured to increase the respective initial power limit for one or more of the plurality of processing nodes by an amount based at least on the difference between the respective low power limit and the respective guard-band power limit of the one or more interfaces.

5. The system as recited in claim 2, wherein in response to the count of throttling being below a second threshold smaller than the first threshold within the time interval for the given processing node, the power management unit is further configured to increase the power limit for the given processing node.

6. The system as recited in claim 5, wherein in response to the count of throttling being below the second threshold within the time interval for the given processing node, the power management unit is further configured to decrease the power limit of at least one of the one or more interfaces based at least on the increase of the power limit of the given processing node.

7. The system as recited in claim 6, wherein an amount of a power limit is based on at least one of: an amount of watts and an amount of leakage current for transistors.

8. The system as recited in claim 7, wherein the one or more interfaces include at least one of: an input/output (I/O) interface, a display interface, a memory controller, and a computer peripheral device interface.

9. A method executable by an integrated circuit comprising:
   increasing a respective initial power limit for one or more of a plurality of processing nodes based at least on a respective initial power limit for one or more interfaces to external devices;
   maintaining a respective count of throttling for each of the plurality of processing nodes during operation, wherein a respective count of throttling comprises a count of transitioning a current performance state (p-state) of a corresponding processing node to a lower p-state responsive to detecting a corresponding temperature reading exceeds a temperature threshold for the corresponding processing node; and
   in response to a count of throttling exceeding a first threshold within a time interval for a given processing node of the plurality of processing nodes, reducing the power limit for the given processing node.

10. The method as recited in claim 9, wherein in response to the count of throttling exceeding the first threshold within the time interval for the given processing node, the method further comprises increasing the power limit of at least one of the one or more interfaces based at least on the reduction of the power limit of the given processing node.

11. The method as recited in claim 10, further comprising setting the respective initial power limit for the one or more interfaces at a respective low power limit associated with an idle state rather than at a power limit associated with a guard-band state for typical use of the plurality of processing nodes.

12. The method as recited in claim 11, further comprising increasing the respective initial power limit for one or more of the plurality of processing nodes by an amount based at least on the difference between the respective low power limit and the respective guard-band power limit of the one or more interfaces.

13. The method as recited in claim 10, wherein in response to the count of throttling being below a second threshold smaller than the first threshold within the time interval for the given processing node, the method further comprises increasing the power limit for the given processing node.

14. The method as recited in claim 13, wherein in response to the count of throttling being below the second threshold within the time interval for the given processing node, the method further comprises decreasing the power limit of at least one of the one or more interfaces based at least on the increase of the power limit of the given processing node.

15. The method as recited in claim 14, wherein an amount of a power limit is based on at least one of: an amount of watts and an amount of leakage current for transistors.

16. The method as recited in claim 15, wherein the one or more interfaces include at least one of: an input/output (I/O) interface, a display interface, a memory controller, and a computer peripheral device interface.

17. A non-transitory computer readable storage medium storing at least one program configured for execution by at least one processor of a computer system, wherein the at least one program comprises instructions executable to:

increase a respective initial power limit for one or more of a plurality of processing nodes based at least on a respective initial power limit for one or more interfaces to external devices;

maintain a respective count of throttling for each of the plurality of processing nodes during operation, wherein a respective count of throttling comprises a count of transitioning a current performance state (p-state) of a corresponding processing node to a lower p-state responsive to detecting a corresponding temperature reading exceeds a temperature threshold for the corresponding processing node; and in response to a count of throttling exceeding a first threshold within a time interval for a given processing node of the plurality of processing nodes, reduce the power limit for the given processing node.

18. The storage medium as recited in claim 17, wherein in response to the count of throttling exceeding the first threshold within the time interval for the given processing node, the instructions are further executable to increase the power limit of at least one of the one or more interfaces based at least on the reduction of the power limit of the given processing node.

19. The storage medium as recited in claim 18, wherein the instructions are further executable to set the respective initial power limit for the one or more interfaces at a respective low power limit associated with an idle state rather than at a power limit associated with a guard-band state for typical use of the plurality of processing nodes.

20. The storage medium as recited in claim 19, wherein the instructions are further executable to increase the respective initial power limit for one or more of the plurality of processing nodes by an amount based at least on the difference between the respective low power limit and the respective guard-band power limit of the one or more interfaces.

* * * * *